(12) United States Patent
Hatano et al.

(10) Patent No.: US 12,364,309 B2
(45) Date of Patent: Jul. 22, 2025

(54) FOOTWEAR AND METHOD OF MANUFACTURING THE SAME

(71) Applicant: ASICS CORPORATION, Kobe (JP)

(72) Inventors: Genki Hatano, Kobe (JP); Kenta Tateno, Kobe (JP); Waka Inoue, Kobe (JP); Shingo Takahashi, Kobe (JP); Masaki Oohara, Kobe (JP); Norihiko Taniguchi, Kobe (JP)

(73) Assignee: ASICS CORPORATION, Kobe (JP)

( * ) Notice: Subject to any disclaimer, the term of this patent is extended or adjusted under 35 U.S.C. 154(b) by 105 days.

(21) Appl. No.: 18/298,850

(22) Filed: Apr. 11, 2023

(65) Prior Publication Data
US 2023/0337783 A1  Oct. 26, 2023

(30) Foreign Application Priority Data
Apr. 21, 2022  (JP) ................ 2022-070254

(51) Int. Cl.
*A43B 3/10* (2006.01)
*A43B 1/00* (2006.01)
(Continued)

(52) U.S. Cl.
CPC .............. *A43B 9/16* (2013.01); *A43B 1/0009* (2013.01); *A43B 1/14* (2013.01); *A43B 3/106* (2013.01);
(Continued)

(58) Field of Classification Search
CPC ................. A43B 5/025; A43B 3/106
(Continued)

(56) References Cited

U.S. PATENT DOCUMENTS

| | | | | |
|---|---|---|---|---|
| 3,468,040 A | * | 9/1969 | Tatuo ............... | A43B 3/108 36/11.5 |
| 3,525,165 A | * | 8/1970 | Randall, Jr. ........... | A43C 15/00 36/133 |

(Continued)

FOREIGN PATENT DOCUMENTS

| | | |
|---|---|---|
| JP | 2018-187363 A | 11/2018 |
| WO | 2009/055451 A1 | 4/2009 |
| WO | 2014/100462 A1 | 6/2014 |

OTHER PUBLICATIONS

Anonymous, "3D printed futuristic shoes!—Results of the Sintratec Shoe Design Contest 2022", SINTRATEC Youtube Channel, Mar. 30, 2022, https://www.youtube.com/watch?v=CzixCTSQehE, XP093077310.
(Continued)

*Primary Examiner* — Ted Kavanaugh
(74) *Attorney, Agent, or Firm* — Studebaker Brackett PLLC

(57) ABSTRACT

A footwear includes: a foot bed portion that supports a sole of a foot of a wearer and has a ground contact surface; and a foot cover portion that covers an instep of the foot of the wearer. At least a part of the foot bed portion and at least a part of the foot cover portion are formed of a single additively manufactured product produced by a stereolithography-type three-dimensional additively manufacturing method, and a protruding portion is provided on an outer surface defined by the additively manufactured product of the foot cover portion.

13 Claims, 23 Drawing Sheets

(51) Int. Cl.
  *A43B 1/14* (2006.01)
  *A43B 3/12* (2006.01)
  *A43B 3/14* (2006.01)
  *A43B 9/16* (2006.01)
  *B33Y 80/00* (2015.01)
(52) U.S. Cl.
  CPC ............... *A43B 3/126* (2013.01); *A43B 3/14* (2013.01); *B33Y 80/00* (2014.12)
(58) Field of Classification Search
  USPC .......................................................... 36/133
  See application file for complete search history.

(56) References Cited

U.S. PATENT DOCUMENTS

| | | | | |
|---|---|---|---|---|
| 3,650,051 | A * | 3/1972 | Sass | .......................... A43B 5/02 36/133 |
| 6,681,503 | B2 * | 1/2004 | Morle | ...................... A43B 5/18 36/133 |
| 2012/0174433 | A1 * | 7/2012 | Mahoney | ............. A43B 13/141 36/28 |
| 2017/0066196 | A1 | 3/2017 | Beard et al. | |
| 2018/0049514 | A1 | 2/2018 | Guyan et al. | |
| 2018/0271213 | A1 | 9/2018 | Perrault et al. | |
| 2019/0261735 | A1 * | 8/2019 | Wawrousek | ............ B29C 44/08 |
| 2020/0245720 | A1 * | 8/2020 | Jarvis | ....................... A43B 9/02 |
| 2021/0212408 | A1 * | 7/2021 | Steidle | ............... A43B 23/0275 |

OTHER PUBLICATIONS

Anonymous, "Shoe model—Rapid prototyped by high speed SLA printer", Lora Sun Youtube Channel, Apr. 3, 2018, https://www.youtube.com/watch?v=OcicAfV4CFE, XP093077312.

The extended European search report issued by the European Patent Office on Sep. 7, 2023, which corresponds to European Patent Application No. 23162612.8-1015 and is related to U.S. Appl. No. 18/298,850.

* cited by examiner

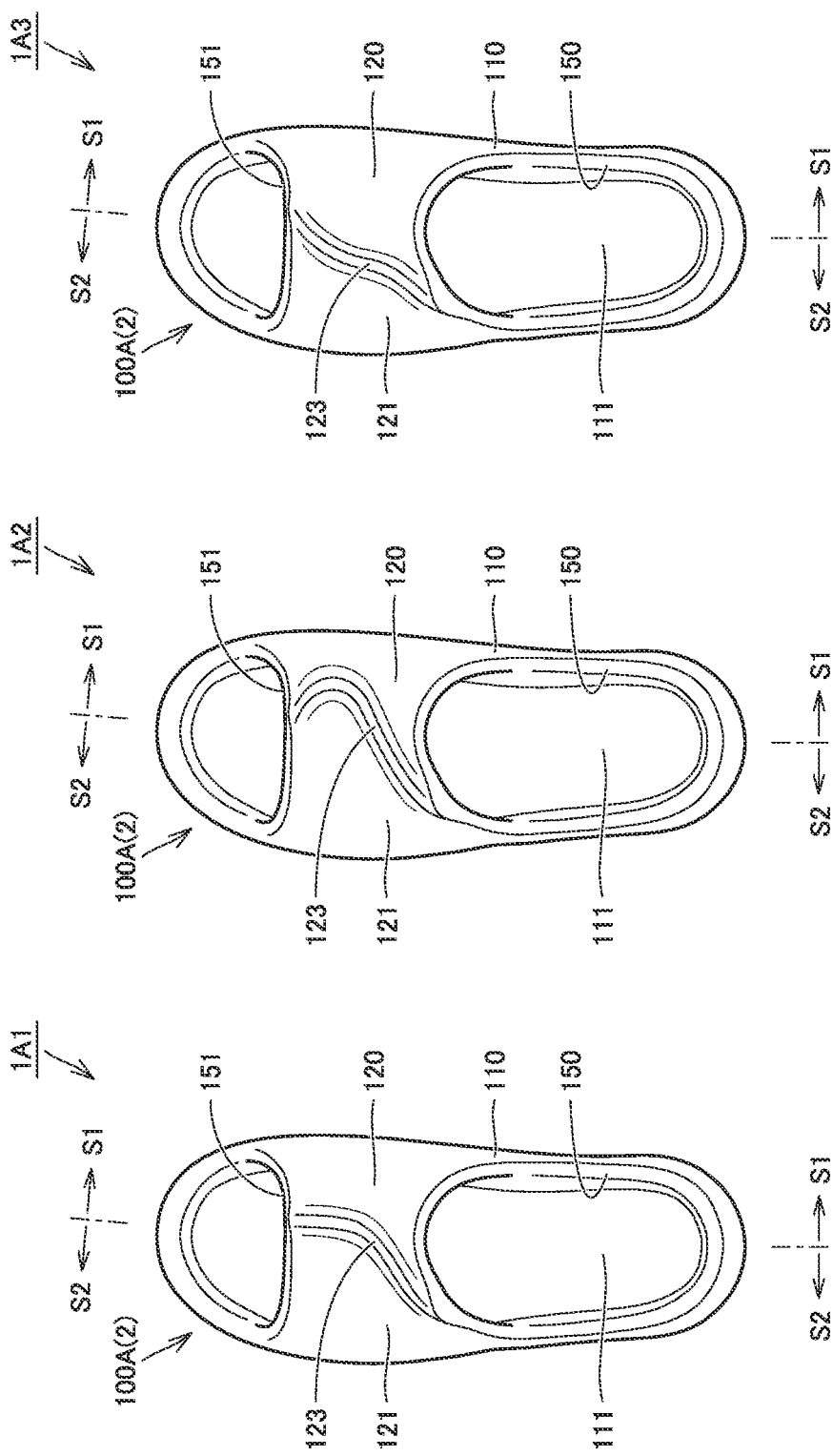

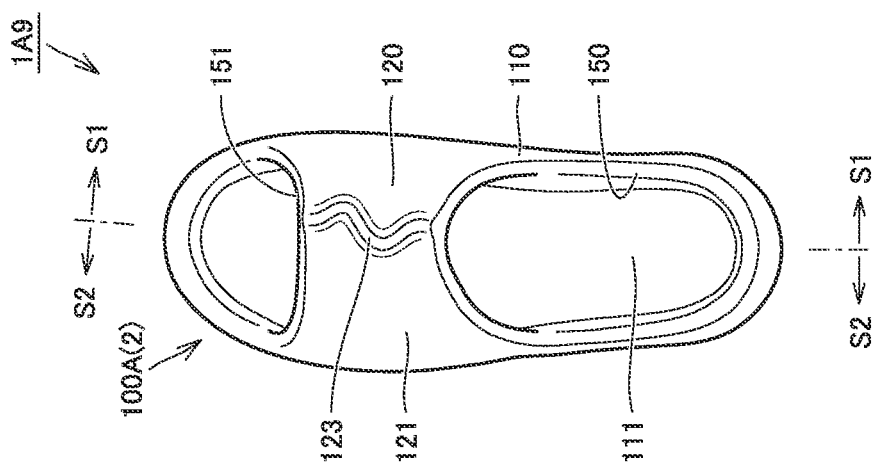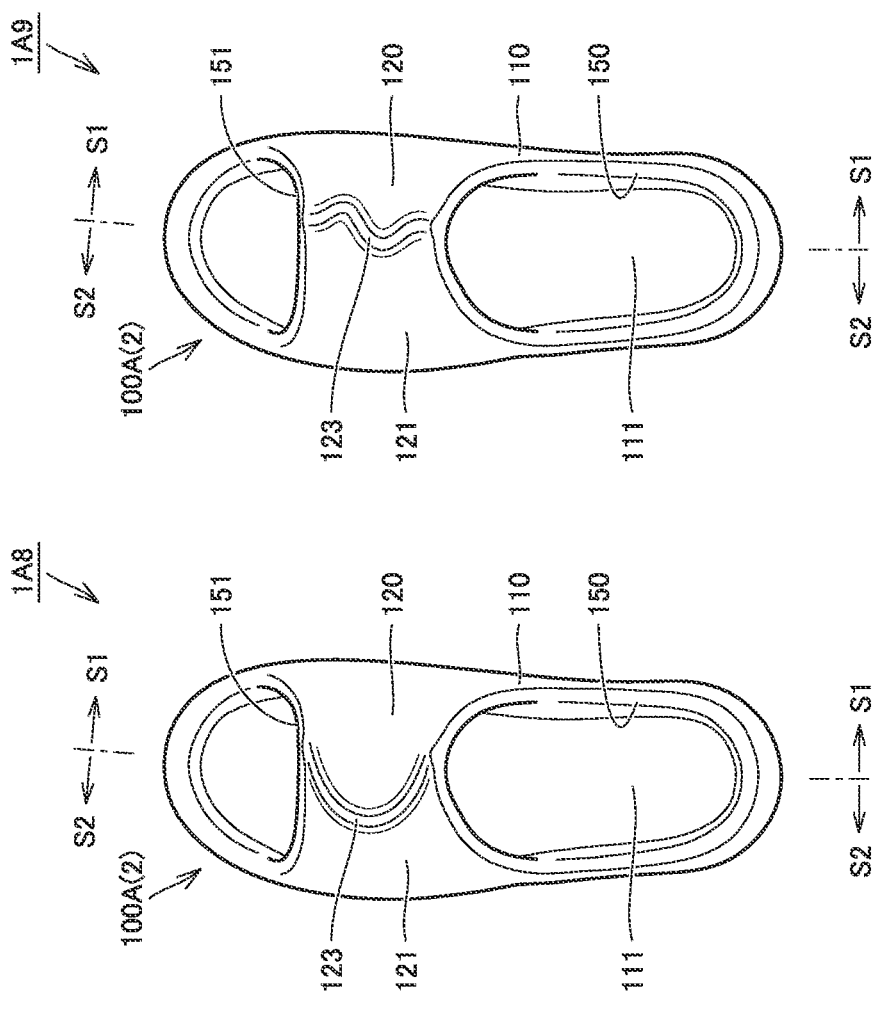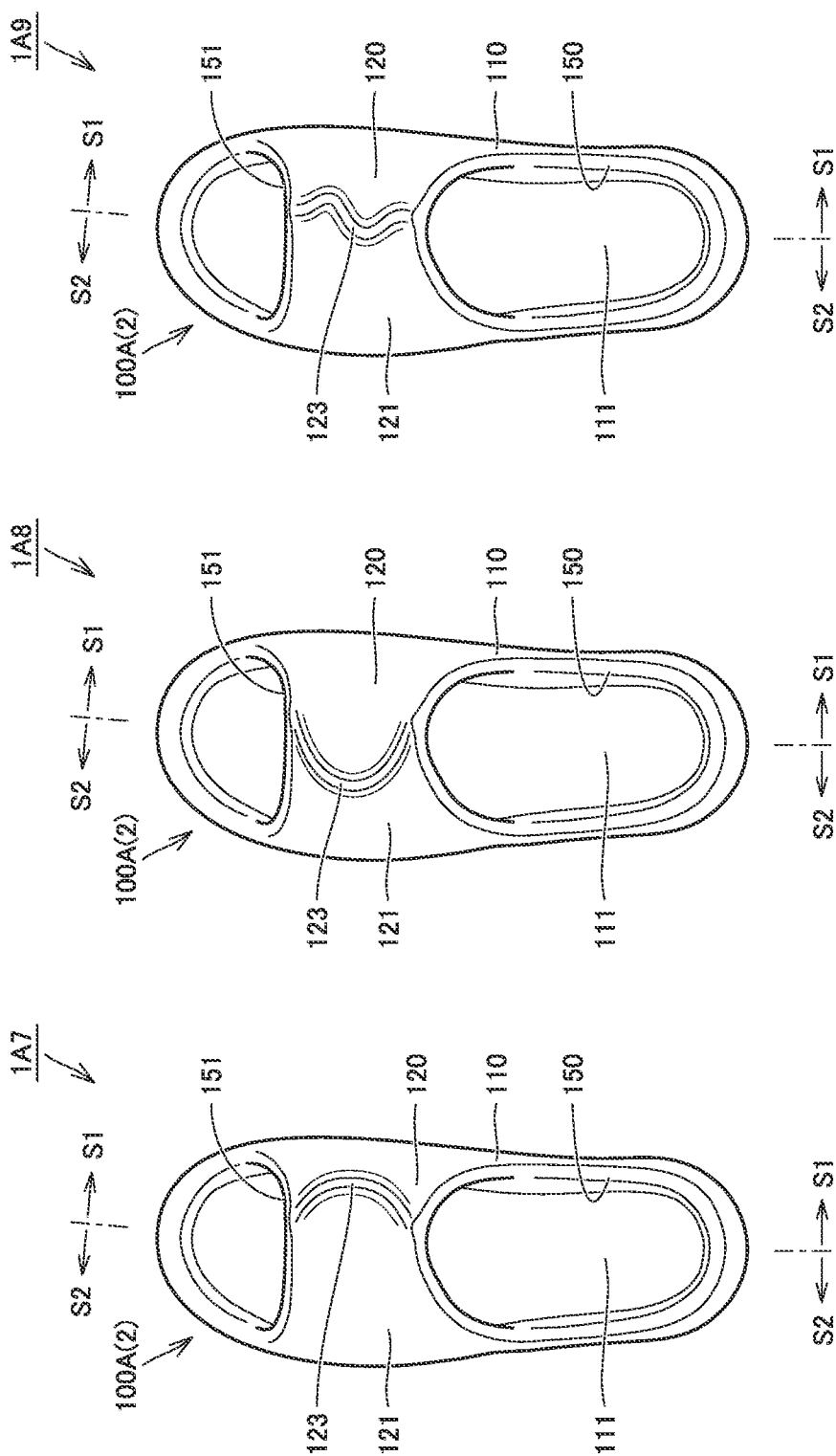

FOOTWEAR AND METHOD OF MANUFACTURING THE SAME

CROSS REFERENCE TO RELATED APPLICATIONS

This nonprovisional application is based on Japanese Patent Application No. 2022-070254 filed on Apr. 21, 2022 with the Japan Patent Office, the entire contents of which are hereby incorporated by reference.

BACKGROUND OF THE INVENTION

Field of the Invention

The present invention relates to a footwear including a foot bed portion and a foot cover portion and typified by a sandal and a shoe, and a method of manufacturing the footwear.

Description of the Background Art

In recent years, production of an additively manufactured product having a desired three-dimensional shape by a three-dimensional additive manufacturing method has become widespread, and has come to be utilized also in the field of footwear. For example, Japanese Patent Laying-Open No. 2018-187363 and U.S. Patent Publication No. 2018/0049514 each disclose a shoe including a sole produced by a three-dimensional additive manufacturing method.

SUMMARY OF THE INVENTION

In general, when a sole to be provided in a shoe is produced by a three-dimensional additive manufacturing method, the additive manufacturing performance for the sole is relatively high due to a significant thickness of the sole, so that shape defects may be less likely to occur during additive manufacturing. However, when a foot cover portion that covers an instep of a wearer's foot is produced by the three-dimensional additive manufacturing method, the additive manufacturing performance may be significantly degraded depending on the additive manufacturing scheme or method.

Specifically, in the cases where the foot cover portion is produced by a stereolithography-type three-dimensional additive manufacturing method and where the foot cover portion is sequentially additively manufactured starting from the ground contact surface side in the direction orthogonal to the ground contact surface of a footwear, the foot cover portion that is thin in thickness and partially formed in a relatively flat shape causes the liquid resin or the liquid rubber as a raw material to hang down by its own weight before it hardens. This may cause shape defects to occur during additive manufacturing.

Thus, the present invention has been made to solve the above-described problems, and an object of the present invention is to provide a footwear that is less likely to suffer from shape defects during additive manufacturing of a foot cover portion by a stereolithography-type three-dimensional additive manufacturing method, and a method of manufacturing the footwear.

A footwear according to the present invention includes: a foot bed portion that supports a sole of a foot of a wearer and has a ground contact surface; and a foot cover portion that covers an instep of the foot of the wearer. At least a part of the foot bed portion and at least a part of the foot cover portion are formed of a single additively manufactured product produced by a stereolithography-type three-dimensional additive manufacturing method. A protruding portion is provided on an outer surface defined by the additively manufactured product of the foot cover portion.

A method of manufacturing a footwear according to the present invention is a method for manufacturing a footwear including: a foot bed portion that supports a sole of a foot of a wearer and has a ground contact surface; and a foot cover portion that covers an instep of the foot of the wearer. The method includes: producing the foot bed portion; and producing the foot cover portion. The producing the foot bed portion and the producing the foot cover portion include, by a stereolithography-type three-dimensional additive manufacturing method, sequentially additively manufacturing at least a part of the foot bed portion starting from a side of the ground contact surface in a direction orthogonal to the ground contact surface, and subsequently, sequentially additively manufacturing at least a part of the foot cover portion to additively manufacture a single additively manufactured product. In the producing the foot cover portion, a protruding portion is provided on an outer surface that is to be defined by the additively manufactured product of the foot cover portion.

The foregoing and other objects, features, aspects, and advantages of the present invention will become apparent from the following detailed description of the present invention, which is understood in conjunction with the accompanying drawings.

BRIEF DESCRIPTION OF THE DRAWINGS

FIGS. 11A, 11B, and 11C are plan views of sandals respectively according to first, second, and third modifications.

FIGS. 13A, 13B, and 13C are plan views of sandals respectively according to seventh, eighth, and ninth modifications.

DESCRIPTION OF THE PREFERRED EMBODIMENTS

Figure 1:
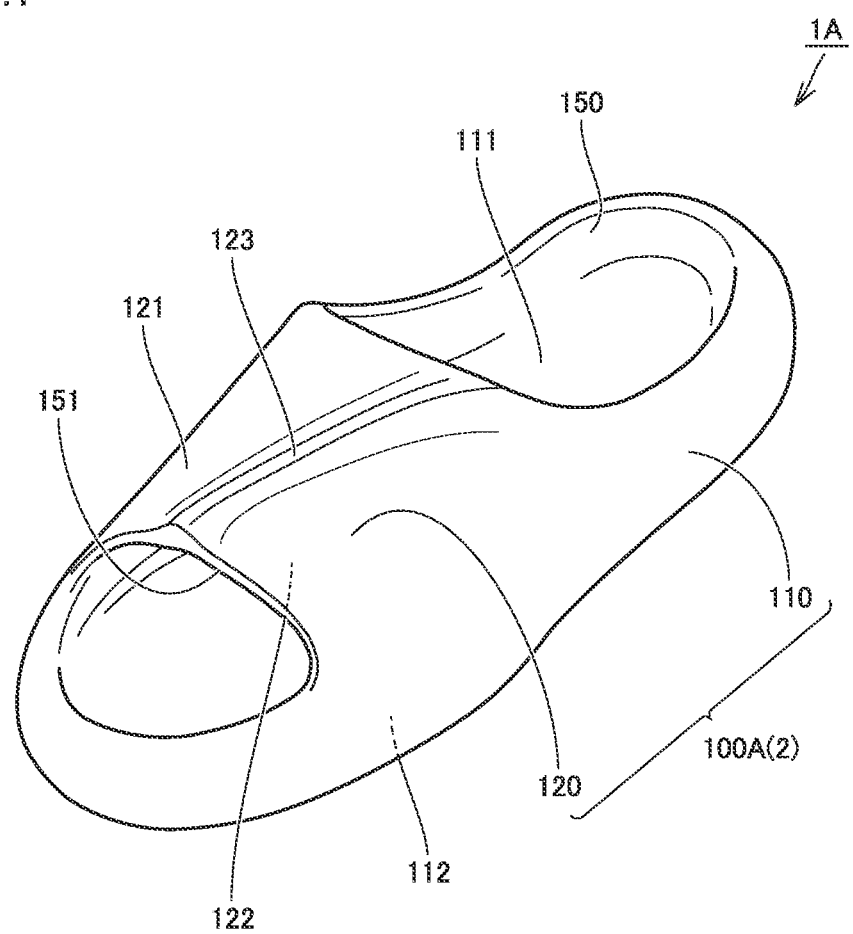
FIG. 1 is a perspective view of a sandal according to a first embodiment.

The following describes embodiments of the present invention in detail with reference to the accompanying drawings. The embodiments described below illustrate examples in which the present invention is applied to a sandal and a shoe as a footwear. In the embodiments described below, the same or common portions are denoted by the same reference characters, and the description thereof will not be repeated.

First Embodiment

Figure 2:
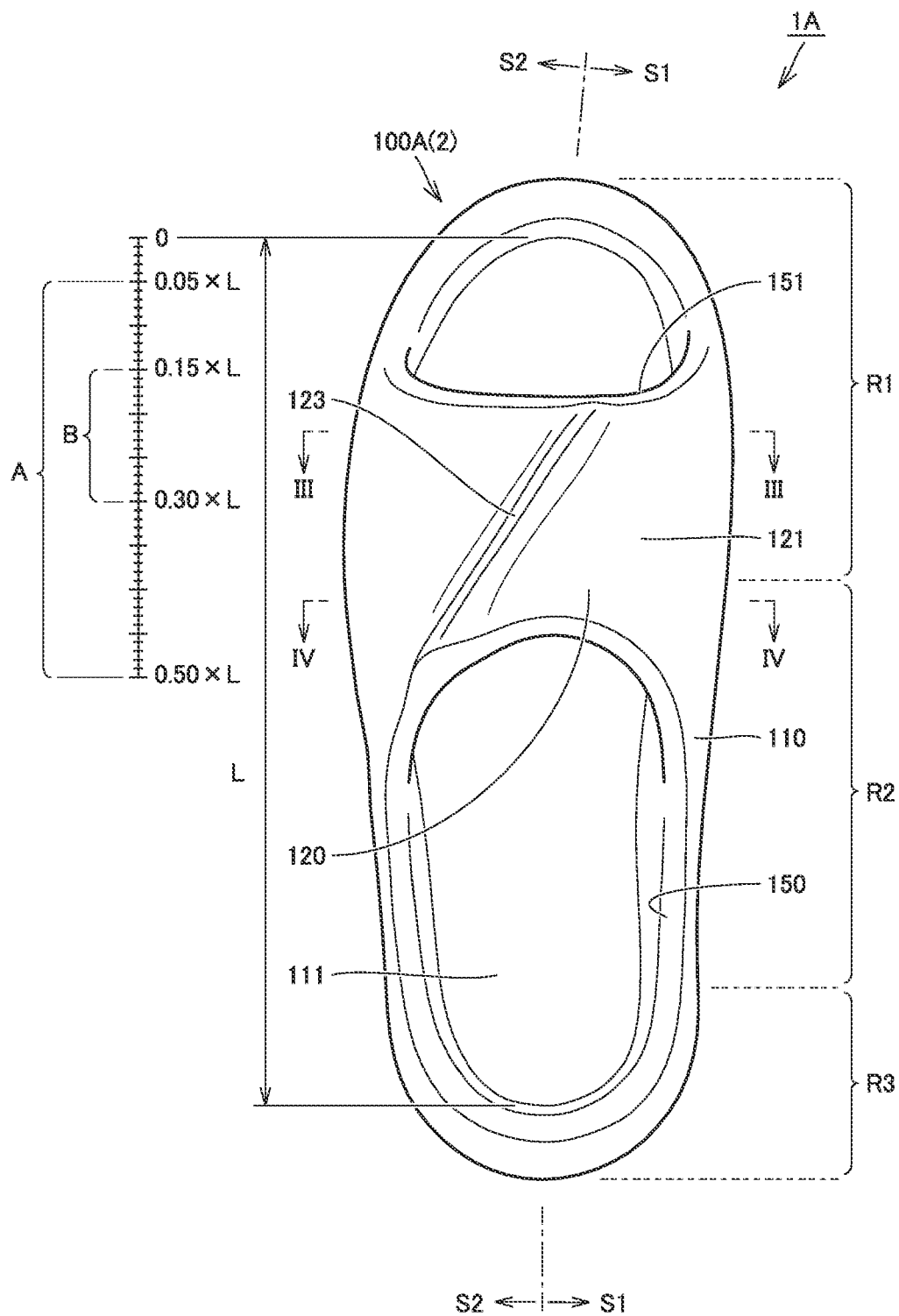
FIG. 2 is a plan view of the sandal shown in FIG. 1.
Figure 3:
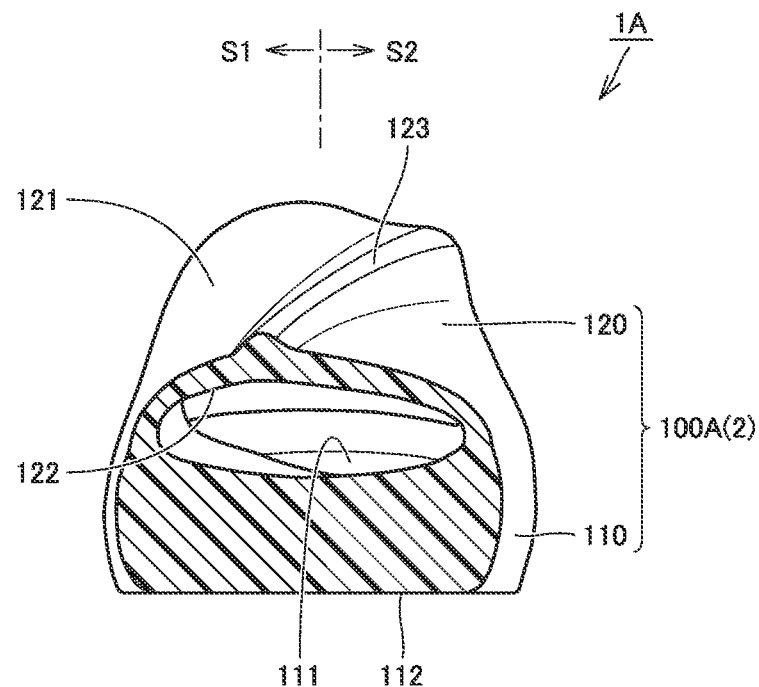
FIG. 3 is a cross-sectional view showing the sandal in FIG. 1 and taken along a line in FIG. 2.
Figure 4:
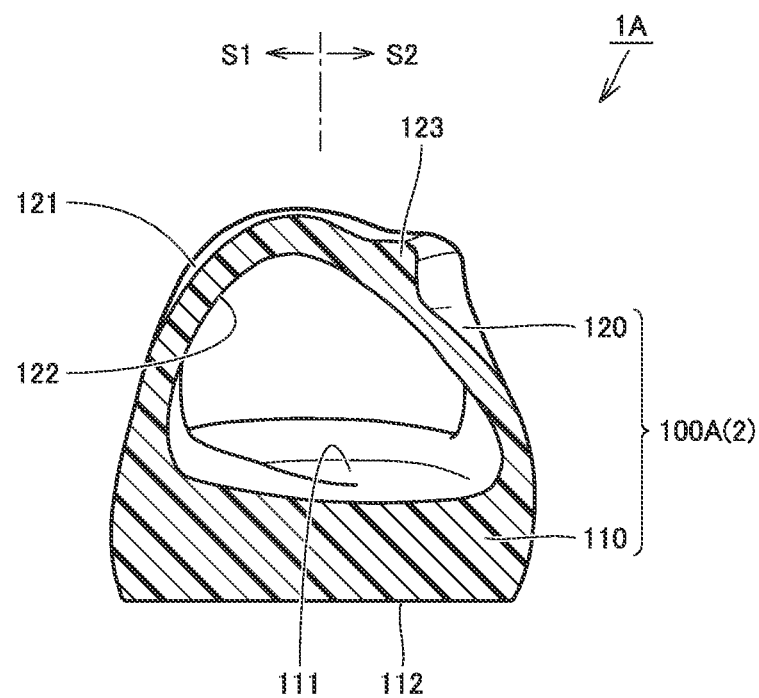
FIG. 4 is a cross-sectional view showing the sandal in FIG. 1 and taken along a line IV-IV in FIG. 2.

FIG. 1 is a perspective view of a sandal according to the first embodiment, and FIG. 2 is a plan view of the sandal shown in FIG. 1. FIGS. 3 and 4 are cross-sectional views showing the sandal in FIG. 1 and taken along lines and IV-IV, respectively, in FIG. 2. The following first describes a configuration of a sandal 1A according to the present embodiment with reference to FIGS. 1 to 4.

As shown in FIGS. 1 to 4, the sandal 1A includes a sandal body 100A including a foot bed portion 110 and a foot cover portion 120. The sandal body 100A is composed of a single member and is formed of an additively manufactured product 2 produced by a stereolithography-type three-dimensional additive manufacturing method (described later).

The foot bed portion 110 serves to support a sole of a wearer's foot and has an upper surface provided with a foot bed region 111 and a lower surface provided with a ground contact surface 112. The foot bed region 111 is capable of supporting the sole of the wearer's foot.

In the sandal 1A according to the present embodiment, the circumferential edge on the upper surface side of the foot bed portion 110 is configured to protrude upward such that the foot of the wearer who is wearing the sandal 1A is positioned on the foot bed portion 110. Thus, the upper surface of the foot bed portion 110 entirely has a recessed shape, and a portion defining a bottom portion in the upper surface of the recessed shape corresponds to the foot bed region 111.

The foot bed region 111 is preferably made of a material that allows a wearer to feel less slippery and also flexible, and the ground contact surface 112 is preferably made of a less slippery material. In the sandal 1A according to the present embodiment, the foot bed region 111 and the ground contact surface 112 are formed of a part of the sandal body 100A composed of a single member. Thus, the foot bed region 111 and the ground contact surface 112 each are formed of a less slippery and flexible material. However, the foot bed region 111 and the ground contact surface 112 may be separately formed of members that are different in material or hardness.

The foot cover portion 120 serves to cover an instep of the wearer's foot and is located above the foot bed portion 110. In the sandal 1A according to the present embodiment, the foot cover portion 120 has a strap shape (i.e., a band shape).

As shown in FIG. 2, when seen in a plan view (i.e., when viewed in the direction orthogonal to the ground contact surface 112), the foot bed portion 110 of the sandal 1A is divided into a forefoot portion R1, a midfoot portion R2, and a rearfoot portion R3 in the front-rear direction (the up-down direction in FIG. 2) corresponding to a foot length direction of the wearer's foot. The forefoot portion R1 supports a toe portion and a ball portion of the wearer's foot, the midfoot portion R2 supports an arch portion of the wearer's foot, and the rearfoot portion R3 supports a heel portion of the wearer's foot.

Also as shown in FIG. 2, when seen in a plan view, the sandal 1A is divided into a portion on the medial foot side (a portion on the S1 side shown in the figure) and a portion on the lateral foot side (a portion on the S2 side shown in the figure) in the left-right direction corresponding to a foot width direction of the wearer's foot (in the left-right direction in the figure). In this case, the portion on the medial foot side corresponds to the medial side of the foot in anatomical position (i.e., the side close to the midline) and the portion on the lateral foot side is opposite to the medial side of the foot in anatomical position (i.e., the side away from the midline).

As shown in FIGS. 1 to 4, the foot cover portion 120 extends in the left-right direction so as to have a substantially mountain-like shape when viewed in the front-rear direction. One end of the foot cover portion 120 is connected to an end portion on the medial foot side of the foot bed portion 110, and the other end of the foot cover portion 120 is connected to an end portion on the lateral foot side of the foot bed portion 110.

Thereby, a topline 150 is formed by the rear end of the foot cover portion 120 and the circumferential edge of the upper surface in a portion of the foot bed portion 110 that is located rearward of the foot cover portion 120. Also, a hollow portion is provided between the foot bed portion 110 and the foot cover portion 120. Thus, the wearer's foot is inserted into the hollow portion through the topline 150, so that the wearer can wear the sandal 1A.

In the sandal 1A according to the present embodiment, in addition to the topline 150 as described above, a front opening 151 is formed by the front end of the foot cover portion 120 and the circumferential edge of the upper surface in a portion of the foot bed portion 110 that is located forward of the foot cover portion 120. During wearing of the sandal, the toes of the wearer's foot are exposed to the outside through the front opening 151.

In this case, in the sandal 1A according to the present embodiment, a ridge portion 123 as a protruding portion is provided at a prescribed position in the foot cover portion 120, which will be described later in detail.

The material of the sandal body 100A is not particularly limited, but is preferably a resin material or a rubber material that can be additively manufactured by a stereolithography-type three-dimensional additive manufacturing method and that allows the additively manufactured sandal body 100A to have appropriate flexibility, elongation, durability, elasticity, and the like. More specifically, when the sandal body 100A is made of resin, examples of resin may be a polyolefin resin, ethylene-vinyl acetate copolymer (EVA), polyamide-based thermoplastic elastomer (TPA, TPAE), thermoplastic polyurethane (TPU), or polyester-based thermoplastic elastomer (TPEE). On the other hand, when the sandal body 100A is made of rubber, for example, butadiene rubber (BR) may be used.

The sandal body 100A can also be formed of a polymer composition. Examples of polymer to be contained in the polymer composition include olefinic polymers such as olefinic elastomers and olefinic resins. Examples of the olefinic polymers include polyolefins such as polyethylene (e.g., linear low density polyethylene (LLDPE), high density polyethylene (HDPE), and the like), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer, propylene-vinyl acetate copolymer, and the like.

The polymer may be an amide-based polymer such as an amide-based elastomer and an amide-based resin. Examples of the amide-based polymer include polyamide 6, polyamide 11, polyamide 12, polyamide 66, polyamide 610, and the like.

The polymer may be an ester-based polymer such as an ester-based elastomer and an ester-based resin. Examples of the ester-based polymer include polyethylene terephthalate, polybutylene terephthalate, and the like.

The polymer may be a urethane-based polymer such as a urethane-based elastomer and a urethane-based resin. Examples of the urethane-based polymer include polyester-based polyurethane, polyether-based polyurethane, and the like.

The polymer may be a styrene-based polymer such as a styrene-based elastomer and a styrene-based resin. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), and the like. Examples of the styrene-based resin include polystyrene, acrylonitrile styrene resin (AS), acrylonitrile butadiene styrene resin (ABS), and the like.

Examples of the polymer include acrylic polymers such as polymethylmethacrylate, urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, polyester-based urethane acrylate, polycarbonate-based urethane acrylate, polyether-based urethane acrylate, epoxy-based methacrylic polymers, conjugated diene polymer-based methacrylic polymers and hydrogenated products thereof, polyvinyl chloride-based resins, silicone-based elastomers, butadiene rubber, isoprene rubber (IR), chloroprene rubber (CR), natural rubber (NR), styrene-butadiene rubber (SBR), acrylonitrile-butadiene rubber (NBR), butyl rubber (IIR), and the like.

In this case, as described above, the sandal body 100A is preferably made of a material that allows a wearer to feel less slippery and also flexible, and thus, the sandal body 100A is preferably made particularly of urethane acrylate among the above-mentioned types of materials. The sandal body 100A made of urethane acrylate is not only excellent in durability and elongation but also sufficient in elasticity. As described above, since the sandal body 100A is produced by the stereolithography-type three-dimensional additive manufacturing method, the sandal body 100A is to contain a curing agent as a subcomponent.

Figure 5:
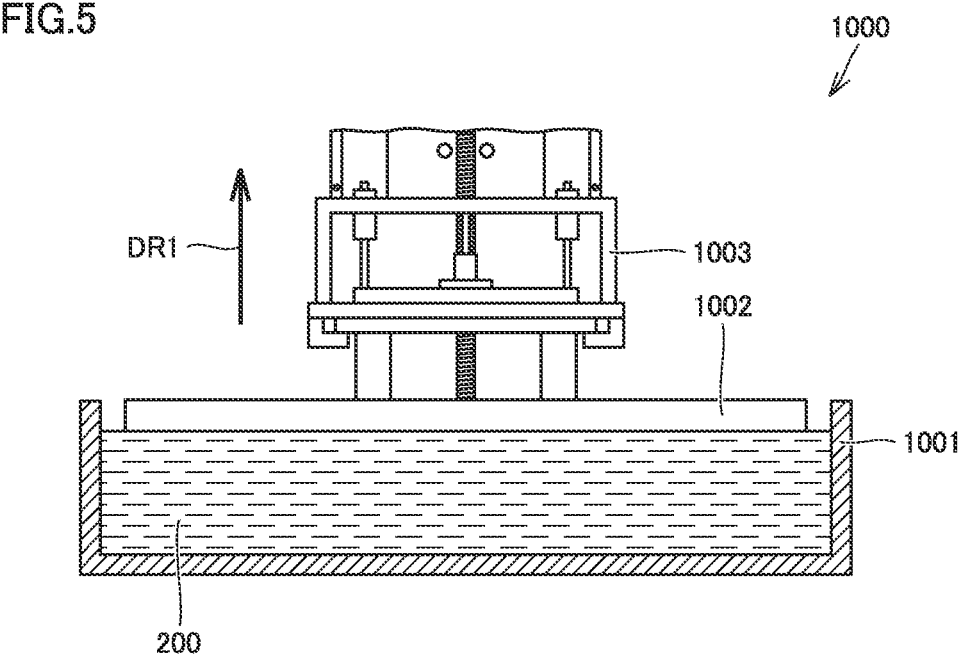
FIGS. 5 to 7 each are a schematic view showing a method of manufacturing the sandal according to the first embodiment.
Figure 6:
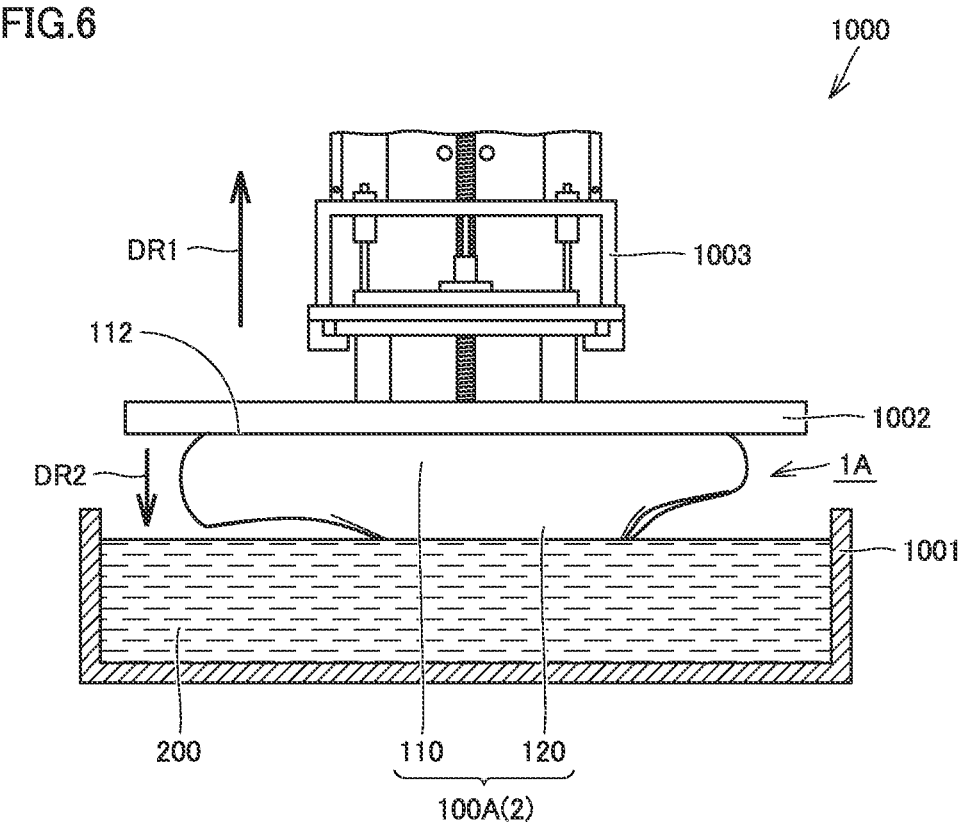
Figure 7:
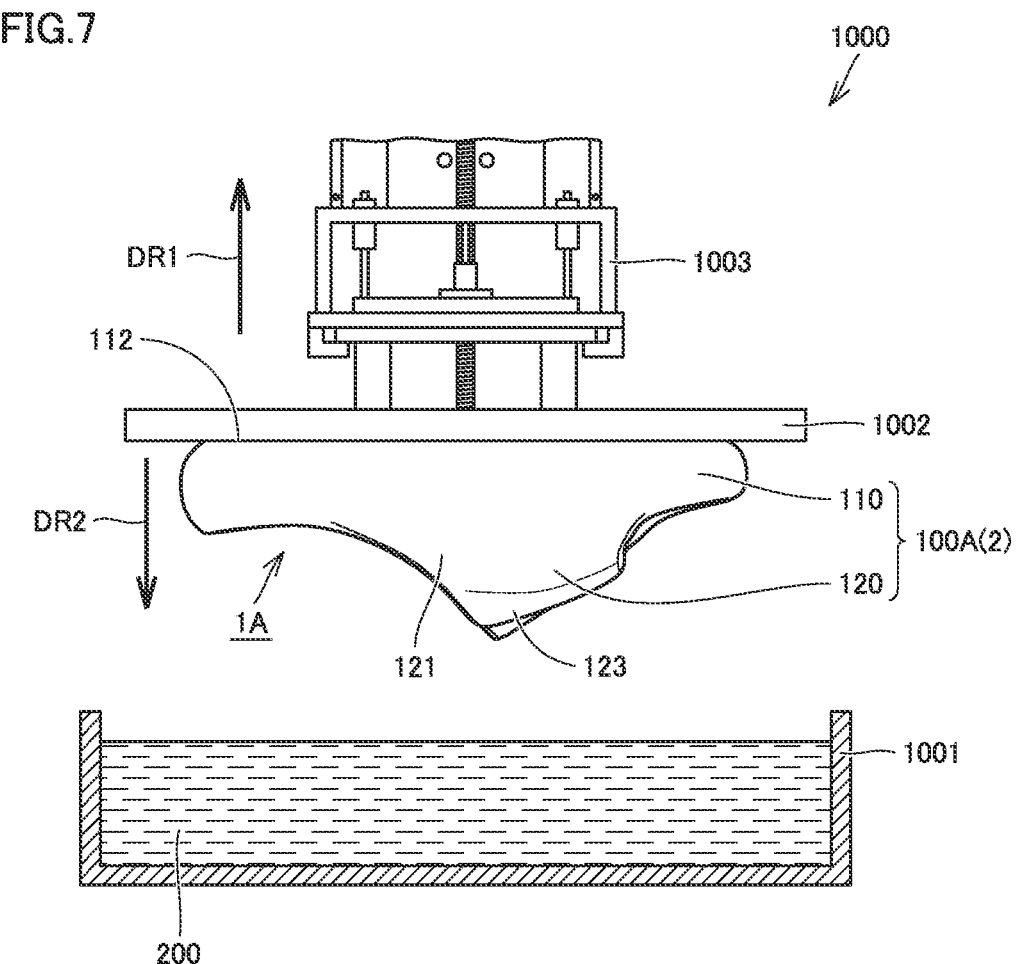

FIGS. 5 to 7 are schematic views showing a method of manufacturing the sandal according to the present embodiment. The following describes the method of manufacturing the sandal according to the present embodiment with reference to FIGS. 5 to 7.

As described above, in the sandal 1A according to the present embodiment, the sandal body 100A including the foot bed portion 110 and the foot cover portion 120 is formed of the additively manufactured product 2 made of a single member produced by the stereolithography-type three-dimensional additive manufacturing method. The sandal body 100A can be additively manufactured, for example, by using a three-dimensional additive manufacturing apparatus 1000 as shown in FIGS. 5 to 7.

The three-dimensional additive manufacturing apparatus 1000 serves to produce an additively manufactured product by the stereolithography-type three-dimensional additive manufacturing method. In this case, according to the stereolithography-type three-dimensional additive manufacturing method, a photocurable liquid resin or liquid rubber that is hardened by light of a specific wavelength is used as a main raw material, to which this light of a specific wavelength is applied to thereby sequentially stack hardened portions, and thus, an additively manufactured product having a desired shape is produced. Examples of the light of a specific wavelength used herein may be ultraviolet light, in which case an ultraviolet curing resin or rubber is used as a main raw material. Note that the above-mentioned liquid resin or liquid rubber as a main raw material is not limited to one-component type but may be two-component type or the like.

As shown in FIGS. 5 to 7, the three-dimensional additive manufacturing apparatus 1000 includes a light source (not shown), a storage tank 1001, a platform 1002, and a hoisting and lowering mechanism 1003. The storage tank 1001 serves to store a liquid resin 200 or the like as a raw material, and the platform 1002 serves to move the additively manufactured product 2 while holding it. The hoisting and lowering mechanism 1003 serves to move the platform 1002 upward and downward.

As shown in FIG. 5, in the three-dimensional additive manufacturing apparatus 1000, the platform 1002 is first moved by the hoisting and lowering mechanism 1003, and thereby, the lower surface of the platform 1002 is placed in contact with the liquid surface of the liquid resin 200 or the like. In this state, light of a specific wavelength emitted from the light source is applied to the vicinity of the liquid surface of the liquid resin 200 or the like in a prescribed pattern for exposure to light. Thereby, a portion of the liquid resin 200 or the like that is located in the vicinity of the liquid surface is hardened in a layered manner while adhering to the lower surface of the platform 1002, so that a first hardened layer is formed.

Then, the platform 1002 is moved upward (i.e., in the direction indicated by an arrow DR1 in the figure) by a prescribed amount by the hoisting and lowering mechanism 1003, to cause the lower surface of the first hardened layer to be placed in contact with the liquid surface of the liquid resin 200 or the like. In this state, light of a specific wavelength emitted from the light source is applied to the vicinity of the liquid surface of the liquid resin 200 or the like in a prescribed pattern for exposure to light. Thereby, a portion of the liquid resin 200 or the like that is located in the vicinity of the liquid surface is hardened in a layered manner while adhering to the lower surface of the first hardened layer, so that a second hardened layer is formed.

By repeating the same step as the step of forming the second hardened layer (i.e., the step of moving the platform 1002 and the step of exposing the liquid resin 200 or the like to light), a plurality of hardened layers are sequentially stacked in the downward direction (i.e., in the direction indicated by an arrow DR2 shown in the figure) as shown in FIG. 6, and thereby, additive manufacturing of the sandal body 100A proceeds. In this additive manufacturing process, additive manufacturing of the foot bed portion 110 and additive manufacturing of the foot cover portion 120 are subsequently performed. At this time, the ridge portion 123 as a protruding portion is provided at a prescribed position in the foot cover portion 120.

Then, as shown in FIG. 7, after all the portions of the sandal body 100A are additively manufactured, the platform 1002 is lifted further upward by the hoisting and lowering mechanism 1003. Then, the sandal body 100A is pulled away from the liquid resin 200 or the like stored in the storage tank 1001 and removed from the three-dimensional additive manufacturing apparatus 1000. At this time, the sandal body 100A that has been additively manufactured is not sufficiently hardened but is still relatively soft. Thus, the removed sandal body 100A is separately heated and substantially hardened, and further cleaned and dried, and then, production of the sandal body 100A completes.

In this way, in the method of manufacturing the sandal according to the present embodiment, by the stereolithography-type three-dimensional additive manufacturing method, the foot bed portion 110 is sequentially additively manufactured starting from the ground contact surface 112 side in the direction orthogonal to the ground contact surface 112, and subsequently, the foot cover portion 120 is sequentially additively manufactured. In other words, in the method of manufacturing the sandal according to the present embodiment, the direction orthogonal to the ground contact surface 112 of the sandal body 100A coincides with the direction in which a plurality of hardened layers are sequentially stacked and the sandal body 100A is additively manufactured (i.e., in the direction indicated by the arrow DR2 shown in the figure).

Figure 8:
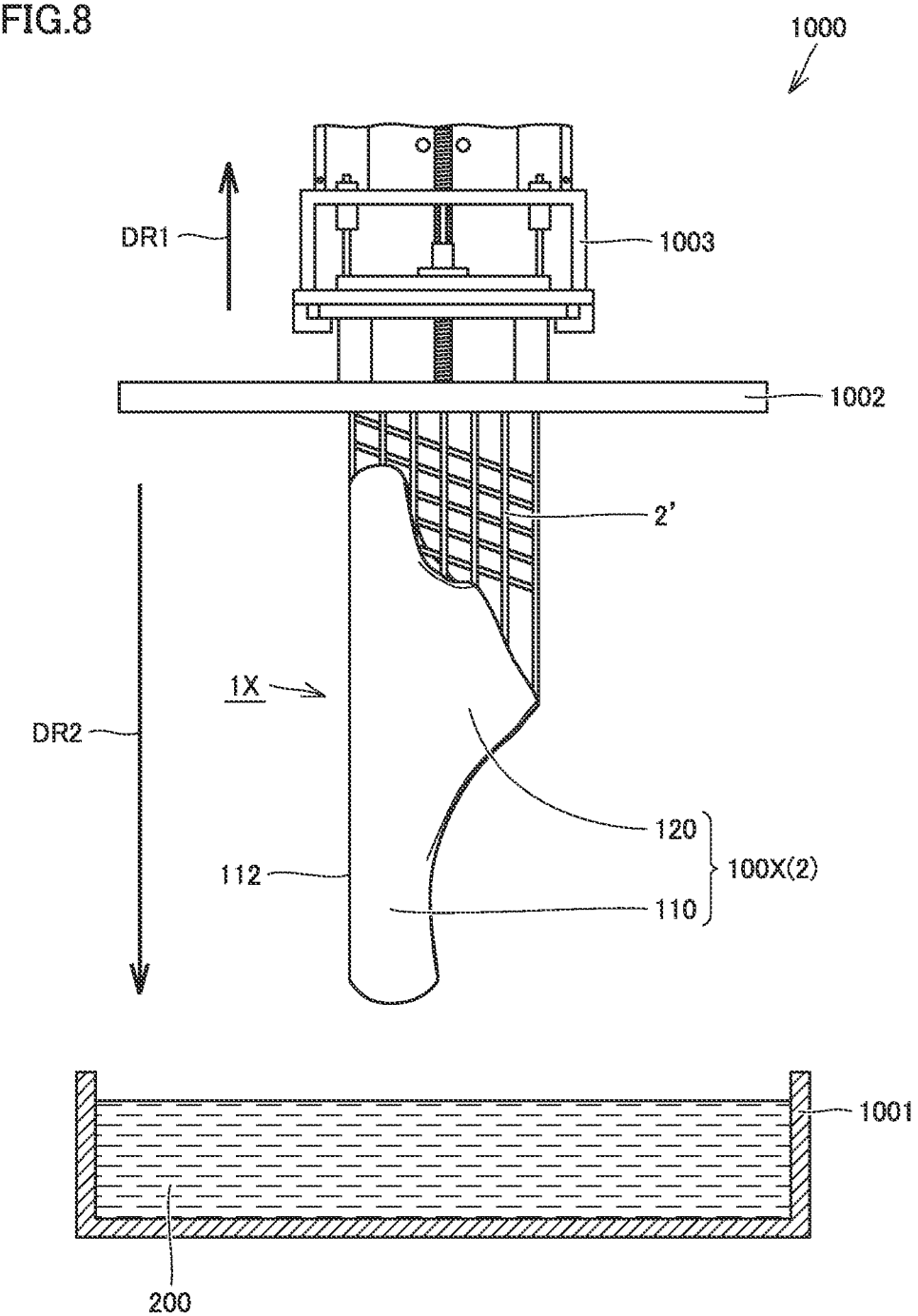
FIG. 8 is a schematic view showing a method of manufacturing a sandal according to a first comparative example.

FIG. 8 is a schematic view showing a method of manufacturing a sandal according to the first comparative example. With reference to FIG. 8, the following describes the method of manufacturing the sandal according to the first comparative example, and also describes the advantages of the method of manufacturing the sandal according to the aforementioned present embodiment over the method of manufacturing the sandal according to the first comparative example.

As shown in FIG. 8, in the method of manufacturing the sandal according to the first comparative example, similarly to the method of manufacturing the sandal according to the aforementioned present embodiment, a sandal body 100X formed of a single member is produced using the three-dimensional additive manufacturing apparatus 1000 by a stereolithography-type three-dimensional additive manufacturing method to thereby manufacture a sandal 1X. However, the method of manufacturing the sandal according to the first comparative example is different from the method of manufacturing the sandal according to the aforementioned present embodiment in the direction in which the sandal body 100X is additively manufactured.

Specifically, in the method of manufacturing the sandal according to the first comparative example, the sandal body 100X is sequentially additively manufactured by the stereolithography-type three-dimensional additive manufacturing method, starting from the forefoot portion R1 (see FIG. 2) toward the rearfoot portion R3 (see FIG. 2) in the front-rear direction. In other words, in the method of manufacturing the sandal according to the first comparative example, the front-rear direction of the sandal body 100X coincides with the direction in which a plurality of hardened layers are sequentially stacked (in the direction indicated by the arrow DR2 shown in the figure).

When the sandal body 100X is additively manufactured in the front-rear direction of the sandal body 100X, there is no portion to be additively manufactured in the direction in which the sandal body 100X is additively manufactured (i.e., in the direction indicated by DR2 shown in the figure) when viewed from the above-described hollow portion that is a relatively large space provided between the foot bed portion 110 and the foot cover portion 120. Thus, additive manufacturing can be conducted with less difficulty, so that the sandal body 100X can be additively manufactured with high accuracy.

However, conversely, the length of the sandal body 100X in the direction in which the sandal body 100X is additively manufactured is increased, which thereby increases the number of repetitions of the above-described moving step and exposure step performed for forming a plurality of hardened layers. This results in longer time required for additive manufacturing, and thereby, the productivity decreases.

Further, due to the relation between the shape of the sandal body 100X to be additively manufactured and the posture (i.e., the orientation) of the sandal body 100X during the additive manufacturing, a support portion 2' as shown in FIG. 8 needs to be formed separately from the sandal body 100X such that the shape of the relatively soft sandal body 100X is maintained during additive manufacturing. This support portion 2' needs to be separated and removed from the sandal body 100X after the sandal body 100X is additively manufactured. This causes additional problems that the number of manufacturing steps increases and waste materials are produced.

On the other hand, since the above-described method of manufacturing the sandal according to the present embodiment is to additively manufacture the sandal body 100A in the direction orthogonal to the ground contact surface 112, the sandal body 100A is relatively short in length in the direction in which the sandal body 100A is additively manufactured. Thus, the number of repetitions of the above-described moving step and exposure step performed for forming a plurality of hardened layers can be significantly reduced as compared with that in the case of the method of manufacturing the sandal according to the first comparative example. This results in shorter time required for additive manufacturing, and thereby, the productivity is significantly improved.

Further, due to the relation between the shape of the sandal body 100A to be additively manufactured and the posture (i.e., the orientation) during this additive manufacturing, the shape of the relatively soft sandal body 100A can be maintained during additive manufacturing even without providing the support portion 2' that is required in the method of manufacturing the sandal according to the first comparative example. This is advantageous in that the number of manufacturing steps does not increase and also waste materials are not produced.

However, when the sandal body 100A is additively manufactured in the direction orthogonal to the ground contact surface 112, conversely, it becomes difficult to additively manufacture the foot cover portion 120 with high accuracy due to the relation between the shape of the sandal body 100A to be additively manufactured and the posture (i.e., the orientation) of the sandal body 100A during additive manufacturing. Thus, if no measures are taken, shape defects may occur in the foot cover portion 120, which will be hereinafter described in detail.

Figure 9:
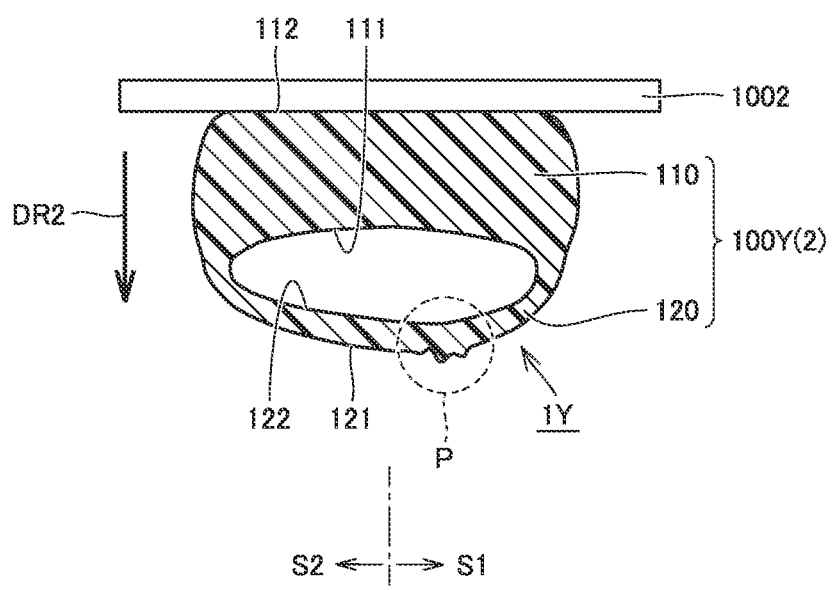
FIG. 9 is a schematic view for illustrating a problem occurring when a sandal is manufactured in accordance with a method of manufacturing a sandal according to a second comparative example.
Figure 10:
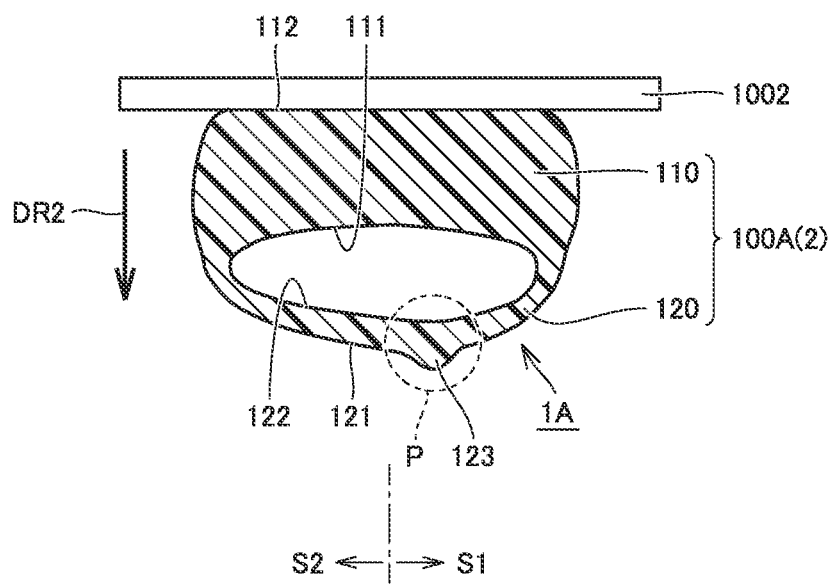
FIG. 10 is a schematic view for illustrating an effect achieved when a sandal is manufactured in accordance with the method of manufacturing the sandal according to the first embodiment.

FIG. 9 is a schematic view for illustrating a problem occurring when a sandal is manufactured in accordance with a method of manufacturing a sandal according to the second comparative example. FIG. 10 is a schematic view for illustrating an effect achieved when a sandal is manufactured in accordance with the method of manufacturing the sandal according to the aforementioned present embodiment.

As shown in FIG. 9, in the method of manufacturing the sandal according to the second comparative example, similarly to the method of manufacturing the sandal according to the aforementioned present embodiment, a sandal 1Y is produced by additively manufacturing a sandal body 100Y in the direction orthogonal to the ground contact surface 112, while no measures are taken for preventing occurrence of shape defects as described above.

In this case, when viewed from the above-mentioned hollow portion that is a relatively large space provided between the foot bed portion 110 and the foot cover portion 120, the foot cover portion 120 is located as a portion to be additively manufactured in the direction in which the sandal body 100Y is to be additively manufactured (i.e., in the direction indicated by DR2 shown in the figure). Since this foot cover portion 120 is thin in thickness and formed in a relatively flat shape, the liquid resin 200 or the like as a raw material hangs down by its own weight before it hardens. Thus, shape defects as shown in FIG. 9 are more likely to occur at a position P shown in this figure. Since such shape defects occur mainly in the outer surface 121 of the foot cover portion 120, the external appearance is significantly impaired. Further, when shape defects occur not only in the outer surface 121 of the foot cover portion 120 but also in an inner surface 122 thereof, the wearing comfort may also decrease.

In this regard, as shown in FIG. 10, in the method of manufacturing the sandal according to the present embodiment, the ridge portion 123 as a protruding portion is provided at a prescribed position (i.e., the position P shown in the figure) on the outer surface 121 of the foot cover portion 120, as will be described later in detail. Thus, the outer surface 121 of this portion is not flat but curved or bent, so that hanging down of the liquid resin 200 or the like can be suppressed in advance. This prevents occurrence of a shape defect as shown in the figure, which makes it possible to prevent impairment of the external appearance and deterioration in wearing comfort.

In general, the surface of the instep of the wearer's foot has a mountain-like shape, and its ridgeline is located on the medial foot side with respect to the central portion of the wearer's foot in the foot width direction. Further, the mountain-like shape of the surface of the instep of the wearer's foot is more gently curved and nearly flat on the toe side and is more significantly curved on the heel side. Thus, in order to achieve an improved fit to the wearer's foot, usually, the inner surface 122 of the foot cover portion 120 is often shaped along the surface of the instep of the wearer's foot having such a mountain-like shape. In this case, the foot cover portion 120 is also often entirely formed in a mountain-like shape.

Thus, in many cases, the portion of the foot cover portion 120 that is located to cover the front side portion of the instep of the wearer's foot is formed to be flatter than the portion of the foot cover portion 120 that is located to cover the rear side portion of the instep of the wearer's foot. Accordingly, during additive manufacturing of the foot cover portion 120, shape defects as described above are more likely to occur in the portion of the foot cover portion 120 that is located to cover the front side portion of the instep of the wearer's foot.

In view of the above, in the sandal 1A according to the present embodiment, as shown in FIGS. 1 to 4, the ridge portion 123 is provided in the portion of the foot cover portion 120 that is located to cover the front side portion of the instep of the wearer's foot, and further, the ridge portion 123 is also provided at the position corresponding to a ridgeline of the surface of the instep of the wearer's foot in the portion of the foot cover portion 120 that is located to cover the front side portion of the instep of the wearer's foot.

Thus, by the sandal 1A according to the present embodiment and the method of manufacturing the sandal according to the present embodiment, occurrence of shape defects can be prevented in advance during additive manufacturing of the foot cover portion 120 by the stereolithography-type three-dimensional additive manufacturing method.

In addition, in the case of the sandal 1A according to the present embodiment, the thickness of the portion provided with the ridge portion 123 in the foot cover portion 120 is larger than the thickness in the surrounding area, so that the rigidity at this portion of the foot cover portion 120 increases. This makes it possible to suppress the shape collapse of the foot cover portion 120 and also achieve a secondary effect of implementing a sandal that can be kept fitted to a foot over a long time period.

In this case, from the viewpoint of suppression of the shape defect during additive manufacturing as described above, a protruding portion typified by the above-mentioned ridge portion 123 is preferably provided at a position in the following range with reference to FIG. 2. Note that this range is specified by dividing the sandal 1A along an imaginary plane orthogonal to the front-rear direction corresponding to the foot length direction of the wearer's foot assuming that the distance from the front end position to the rear end position in the foot bed region 111 in the front-rear direction is defined as L.

Preferably, the protruding portion (the ridge portion 123) is provided at a position in a range A shown in FIG. 2. Specifically, the protruding portion (the ridge portion 123) is preferably provided at a position in the range A (shown in FIG. 2) sandwiched between an imaginary plane set at a position distanced by 0.05×L in the front-rear direction from the front end position of the foot bed region 111 and an imaginary plane set at a position distanced by 0.50×L in the front-rear direction from the front end position of the foot bed region 111.

More preferably, the protruding portion (the ridge portion 123) is provided at a position in a range B shown in FIG. 2. Specifically, the protruding portion (the ridge portion 123) is preferably provided at a position in the range B (shown in FIG. 2) sandwiched between an imaginary plane set at a position distanced by 0.15×L in the front-rear direction from the front end position of the foot bed region 111 and an imaginary plane set at a position distanced by 0.30×L in the front-rear direction from the front end position of the foot bed region 111.

From a different point of view, the protruding portion (the rigid portion 123) is preferably provided at a position at which, when a wearer having feet each having a standard size conforming to the size of the sandal wears this sandal, the protruding portion covers one-quarter of the metatarsal bone of the wearer's foot in a range from the front end of the metatarsal bone toward the rear side thereof.

By providing the protruding portion as typified by the aforementioned ridge portion 123 in the range A, the range B, or the range of one-quarter of the metatarsal bone, occurrence of shape defects can be reliably prevented during additive manufacturing of the foot cover portion 120 by the stereolithography-type three-dimensional additive manufacturing method. Note that the shape of the protruding portion is not limited to the shape of the ridge portion 123 as shown in the figure but may be variously modified.

In the sandal 1A according to the present embodiment, the ridge portion 123 as a protruding portion is provided on the outer surface 121 of the foot cover portion 120 so as to extend from the front end to the rear end of the foot cover portion 120. More specifically, the ridge portion 123 extends linearly so as to intersect the left-right direction corresponding to the foot width direction of the wearer's foot, the front end of the ridge portion 123 is located on the medial foot side (i.e., the S1 side) with respect to the central portion in the left-right direction, and the rear end of the ridge portion 123 is located on the lateral foot side (i.e., the S2 side) with respect to the central portion in the left-right direction. More specifically, the ridge portion 123 extends linearly in the oblique direction so as to be gradually away from the end portion on the medial foot side of the foot cover portion 120 from the front end toward the rear end of the ridge portion 123.

The protruding height of the protruding portion typified by the ridge portion 123 is not particularly limited but is preferably in the range of 3.0 mm or more and 10.0 mm or less with respect to the area surrounding the portion where the protruding portion is provided. When the protruding height of the protruding portion is 3.0 mm or less, the above-described effect of suppressing the shape defect during additive manufacturing may not be sufficiently achieved. When the protruding height of the protruding portion is 10.0 mm or more, the design characteristics may be impaired.

Further, when the width of the protruding portion (the breadth that is the dimension in the direction orthogonal to the extending direction of the protruding portion provided as the ridge portion 123) is preferably 1.5 mm or more and 30.0 mm or less, and more preferably 5.0 mm or more and 15.0 mm or less.

In this case, the mountain-like shape of the surface of the instep of the wearer's foot is more gently curved and nearly flat on the toe side and is more significantly curved on the heel side as described above. In view of the above, when the protruding portion is provided so as to extend from the portion closer to the front end of the foot cover portion 120 to the portion closer to the rear end thereof, and also when the protruding portion is formed to have different protruding heights and different widths from part to part in consideration of the design characteristics, it is preferable that the protruding height and the width of the protruding portion in the portion closer to the rear end of the foot cover portion 120 are larger than the protruding height and the width of the protruding portion in the portion closer to the front end of the foot cover portion 120. Note that the aforementioned case where the protruding portion is provided so as to extend from the portion closer to the front end of the foot cover portion 120 to the portion closer to the rear end thereof includes not only the case where the protruding portion is formed of the ridge portion 123 as in the present embodiment, but also the case where the protruding portion is formed of a plurality of projecting portions 124 as in the twelfth and thirteenth modifications, which will be described later.

<First to Thirteenth Modifications>

Figures 12A, 12B, 12C:
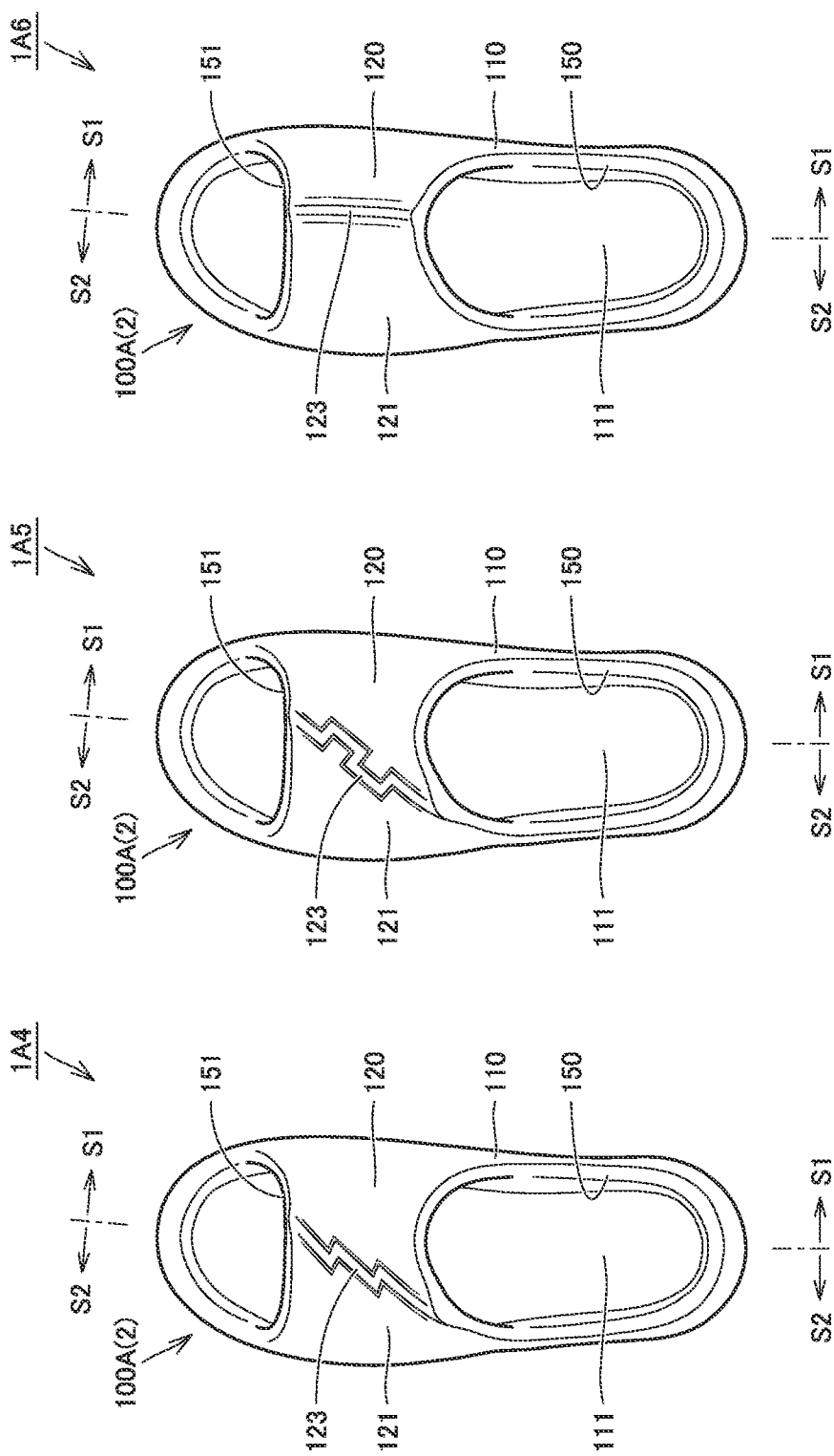
FIGS. 12A, 12B, and 12C are plan views of sandals respectively according to fourth, fifth, and sixth modifications.
Figure 14A:
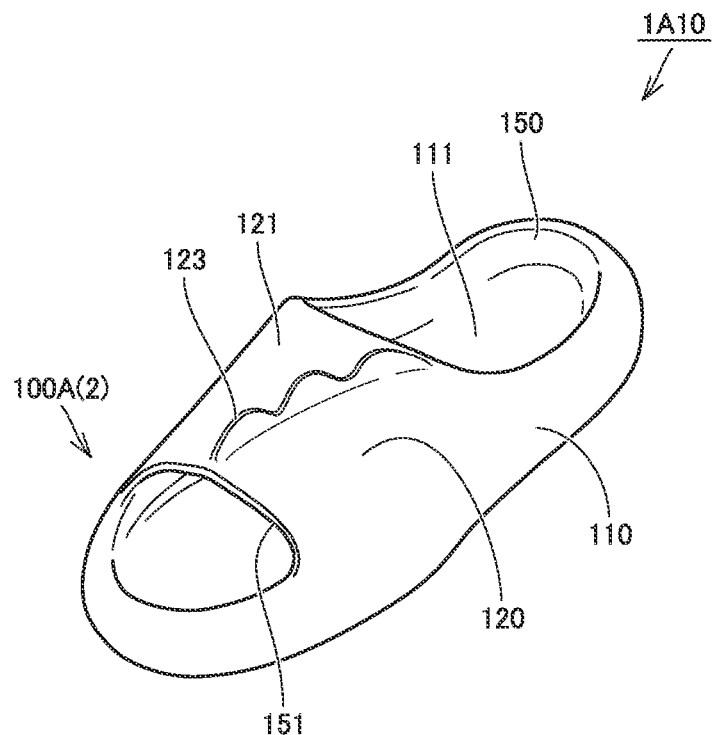
FIGS. 14A and 14B are perspective views of sandals respectively according to tenth and eleventh modifications.
Figure 14B:
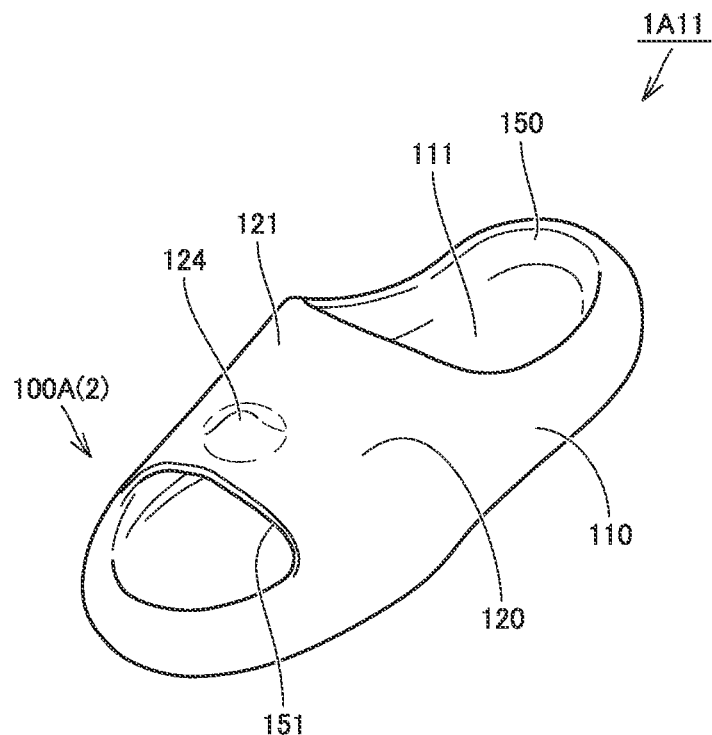
Figure 15A:
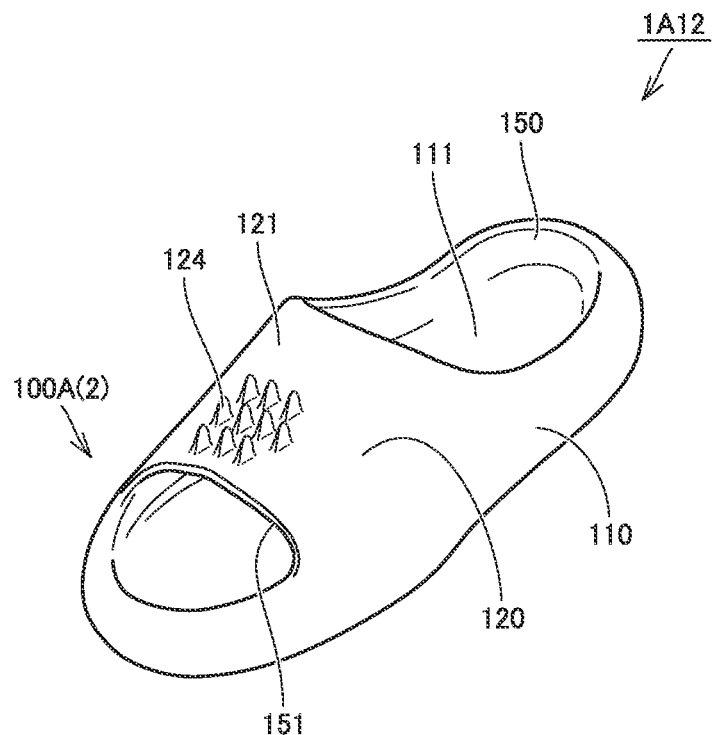
FIGS. 15A and 15B are perspective views of sandals respectively according to twelfth and thirteenth modifications.
Figure 15B:
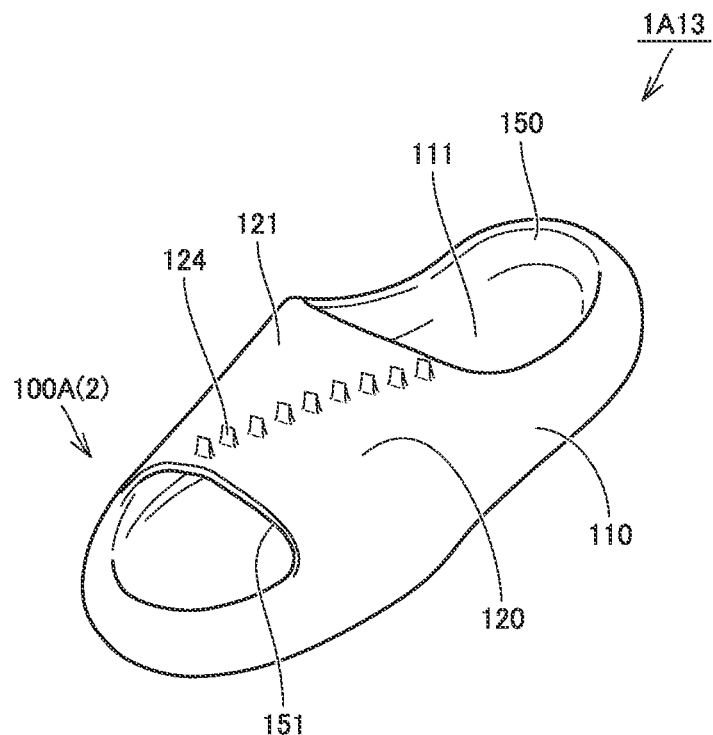

FIGS. 11A, 11B, and 11C are plan views of sandals respectively according to first, second, and third modifications. FIGS. 12A, 12B, and 12C are plan views of sandals respectively according to fourth, fifth, and sixth modifications. FIGS. 13A, 13B, and 13C are plan views of sandals respectively according to seventh, eighth, and ninth modifications. FIGS. 14A and 14B are perspective views of sandals respectively according to tenth and eleventh modifications. FIGS. 15A and 15B are perspective views of sandals respectively according to twelfth and thirteenth modifications. With reference to FIGS. 11A to 15B, the following describes sandals 1A1 to 1A13 according to the first to thirteenth modifications based on the aforementioned first embodiment.

As shown in FIGS. 11A to 15B, the sandals 1A1 to 1A13 according to the first to thirteenth modifications are different from the sandal 1A according to the first embodiment in the shape and/or the position of the protruding portion provided on the outer surface 121 of the foot cover portion 120, but are similar in other configurations to the sandal 1A according to the aforementioned first embodiment. Also, the sandals 1A1 to 1A13 according to the first to thirteenth modifications are manufactured by the manufacturing method pursuant to the method of manufacturing the sandal according to the aforementioned first embodiment.

In each of the sandals 1A1 to 1A13 according to the first to thirteenth modifications, occurrence of shape defects during additive manufacturing is suppressed by providing a protruding portion on the outer surface 121 of the foot cover portion 120, while the external appearance of each of the sandals 1A1 to 1A13 is variously modified by providing a protruding portion different in shape and/or position from that in the sandal 1A according to the first embodiment.

As shown in FIGS. 11A to 11C, and FIGS. 12A and 12B, in each of the sandals 1A1 to 1A5 according to the first to fifth modifications, the ridge portion 123 as a protruding portion is provided so as to extend from the front end to the rear end of the foot cover portion 120. More specifically, the ridge portion 123 extends linearly so as to intersect the left-right direction corresponding to the foot width direction of the wearer's foot, the front end of the ridge portion 123 is located on the medial foot side with respect to the central portion in the left-right direction, and the rear end of the ridge portion 123 is located on the lateral foot side with respect to the central portion in the left-right direction.

In this case, as shown in FIGS. 11A to 11C, in each of the sandals 1A1 to 1A3 according to the first to third modifications, the ridge portion 123 extends to be smoothly curved. Also, as shown in FIGS. 12A and 12B, in each of the sandals 1A4 and 1A5 according to the fourth and fifth modifications, the ridge portion 123 extends to bend.

As shown in FIG. 12C and FIGS. 13A to 13C, in each of the sandals 1A6 to 1A9 according to the sixth to ninth modifications, the ridge portion 123 as a protruding portion is provided to extend from the front end to the rear end of the foot cover portion 120. More specifically, the ridge portion 123 extends linearly so as to intersect the left-right direction corresponding to the foot width direction of the wearer's foot, and each of the front end and the rear end of the ridge portion 123 is located on the medial foot side with respect to the central portion in the left-right direction.

In this case, as shown in FIG. 12C, in the sandal 1A6 according to the sixth modification, the ridge portion 123 extends linearly in the front-rear direction. As shown in FIGS. 13A to 13C, in each of the sandals 1A7 to 1A9 according to the seventh to ninth modifications, the ridge portion 123 extends to be smoothly curved.

As shown in FIG. 14A, in the sandal 1A10 according to the tenth modification, the ridge portion 123 as a protruding portion is provided to extend from the front end to the rear end of the foot cover portion 120. More specifically, the ridge portion 123 extends linearly so as to intersect the left-right direction corresponding to the foot width direction of the wearer's foot, the front end of the ridge portion 123 is located on the medial foot side with respect to the central portion in the left-right direction, and the rear end of the ridge portion 123 is located on the lateral foot side with respect to the central portion in the left-right direction. The ridge portion 123 extends linearly in the oblique direction so as to be gradually away from the end portion on the medial foot side of the foot cover portion 120 from the front end toward the rear end of the ridge portion 123, and the ridge portion 123 is formed to protrude in different height from part to part.

As shown in FIG. 14B, in the sandal 1A11 according to the eleventh modification, a projecting portion 124 as a protruding portion is provided at a portion closer to the front end of the foot cover portion 120. More specifically, the projecting portion 124 is formed in a spot-like shape and located on the medial foot side with respect to the central portion in the left-right direction corresponding to the foot width direction of the wearer's foot.

As shown in FIG. 15A, in the sandal 1A12 according to the twelfth modification, a plurality of projecting portions 124 as protruding portions are provided in a portion closer to the front end of the foot cover portion 120. More specifically, the plurality of projecting portions 124 each are formed in a spot-like shape and arranged in a dotted manner in a central portion in the left-right direction corresponding to the foot width direction of the wearer's foot and at a position on the medial foot side with respect to the central portion.

As shown in FIG. 15B, in the sandal 1A13 according to the thirteenth modification, a plurality of projecting portions 124 as protruding portions are provided in a dotted-line manner in the foot cover portion 120 from a portion closer to the front end of the foot cover portion 120 to a portion closer to the rear end thereof. Among the plurality of projecting portions 124 provided in a dotted-line manner, the projecting portions 124 provided in the portion closer to the front end of the foot cover portion 120 are located on the medial foot side with respect to the central portion in the left-right direction corresponding to the foot width direction of the wearer's foot while the projecting portions 124 provided in the portion closer to the rear end of the foot cover portion 120 are located on the lateral foot side with respect to the central portion in the left-right direction.

Also in the case of the sandals 1A1 to 1A13 according to the first to thirteenth modifications exemplified above, the same effect as that described in the aforementioned first embodiment can be achieved, and thus, occurrence of shape defects can be prevented during additive manufacturing of the foot cover portion 120 by the stereolithography-type three-dimensional additive manufacturing method.

<Fourteenth Modification>

Figure 16:
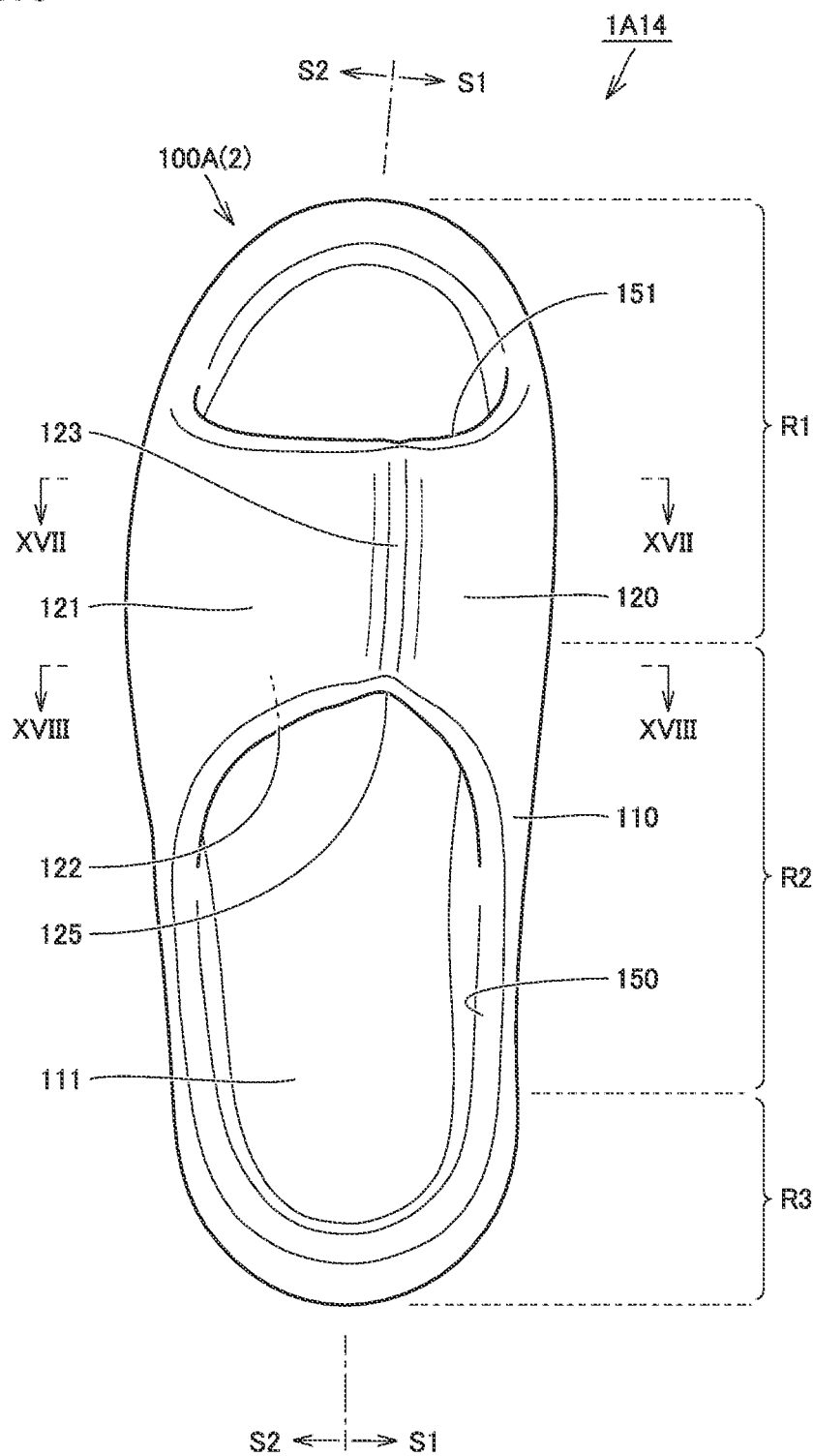
FIG. 16 is a plan view of a sandal according to a fourteenth modification.
Figure 17:
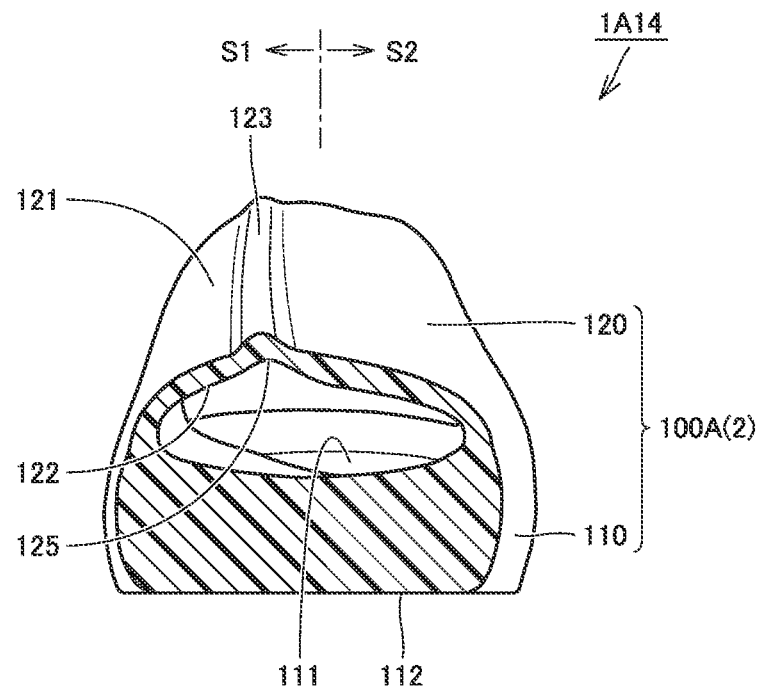
FIG. 17 is a cross-sectional view showing the sandal in FIG. 16 and taken along a line XVII-XVII in FIG. 16.
Figure 18:
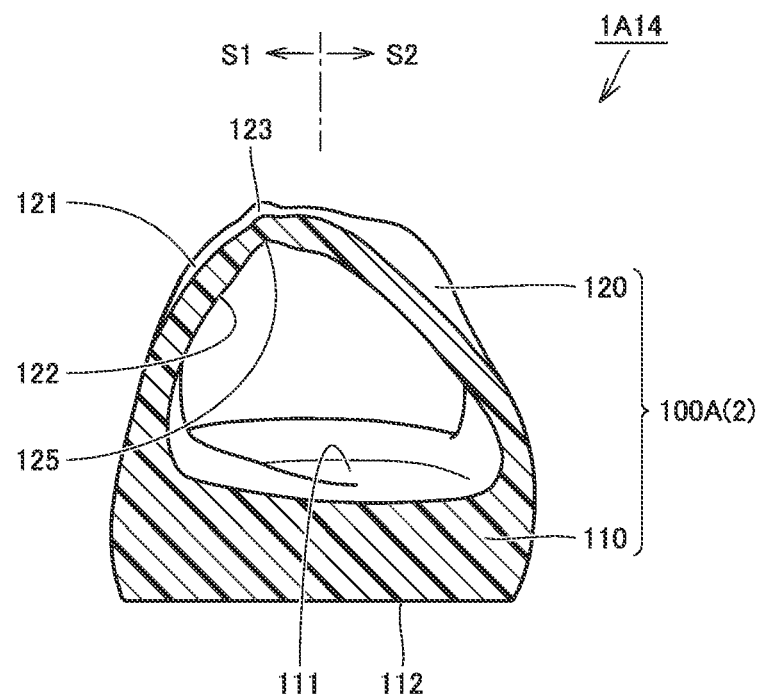
FIG. 18 is a cross-sectional view showing the sandal in FIG. 16 and taken along a line XVIII-XVIII in FIG. 16.

FIG. 16 is a plan view of a sandal according to the fourteenth modification. FIGS. 17 and 18 are cross-sectional views showing the sandal in FIG. 16 and taken along a line XVII-XVII and a line XVIII-XVIII, respectively, in FIG. 16. With reference to FIGS. 16 to 18, the following describes a sandal 1A14 according to the fourteenth modification based on the aforementioned first embodiment. Note that the sandal 1A14 according to the present fourteenth modification is manufactured by a manufacturing method pursuant to the method of manufacturing the sandal according to the aforementioned first embodiment.

As shown in FIGS. 16 to 18, in the sandal 1A14 according to the fourteenth modification, similarly to the sandal 1A6 (see FIG. 12C) according to the aforementioned sixth modification, a ridge portion 123 as a protruding portion provided on the outer surface 121 of the foot cover portion 120 extends linearly in the front-rear direction such that both the front end and the rear end of the ridge portion 123 are located on the medial foot side with respect to the central portion in the left-right direction corresponding to the foot width direction of the wearer's foot.

In addition, in the sandal 1A14, a groove portion 125 extending in the extending direction of the ridge portion 123 is provided in the inner surface 122 of the foot cover portion 120 in the portion where the ridge portion 123 is formed. In other words, the groove portion 125 extends linearly in the front-rear direction such that both the front end and the rear end of the groove portion 125 are located on the medial foot side with respect to the central portion in the left-right direction corresponding to the foot width direction of the wearer's foot.

The portion provided with the groove portion 125 and located on the medial foot side with respect to the central portion in the left-right direction corresponding to the foot width direction of the wearer's foot corresponds to the portion along which the ridgeline of the surface of the instep of the wearer's foot is located. Thus, in the configuration as described above, the groove portion 125 provided in the inner surface 122 of the foot cover portion 120 overlaps with the ridgeline of the surface of the instep of the wearer's foot while the wearer wears the sandal, so that a correspondingly improved fit to the wearer's foot is achieved.

Therefore, similarly to the sandal 1A according to the aforementioned first embodiment, the sandal 1A14 according to the present fourteenth modification not only can prevent occurrence of shape defects during the additive manufacturing of the foot cover portion 120 by the stereolithography-type three-dimensional additive manufacturing method, but also can achieve the effect of implementing a sandal for which an improved fit to the wearer's foot is achieved.

<Fifteenth Modification>

Figure 19:
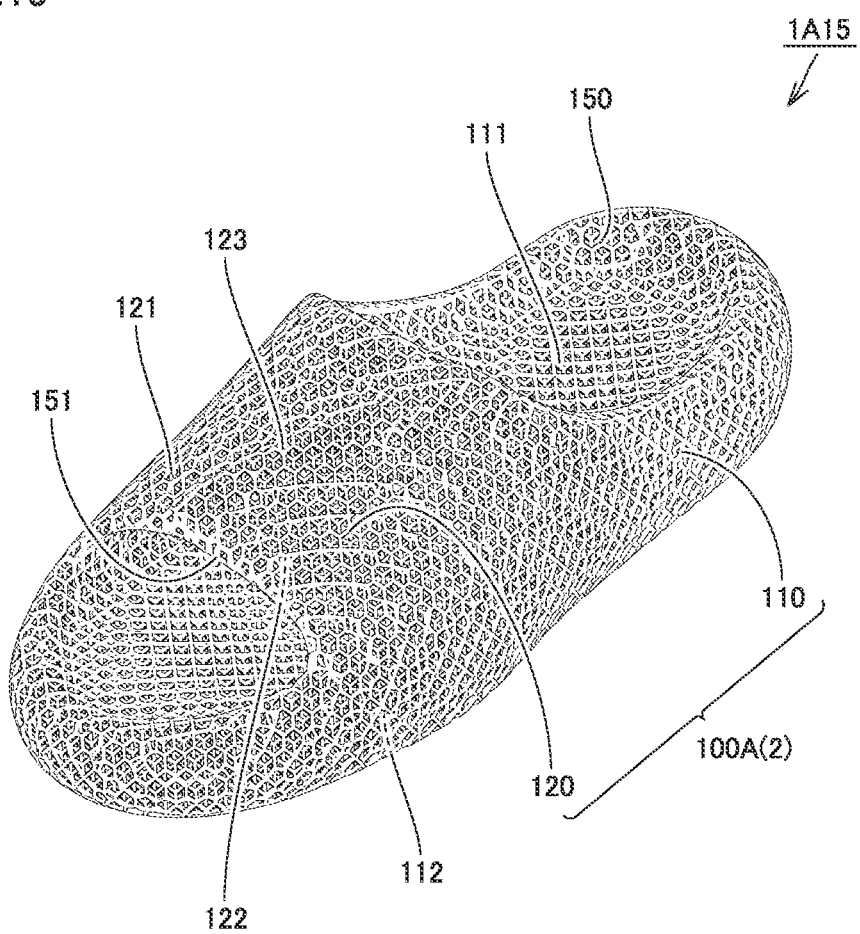
FIG. 19 is a perspective view of a sandal according to a fifteenth modification.
Figure 20:
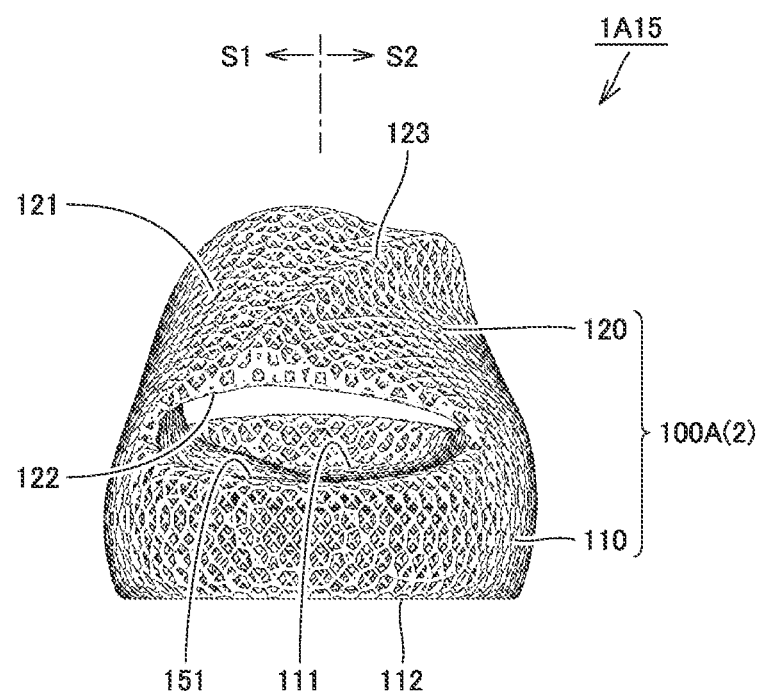
FIG. 20 is a front view of the sandal shown in FIG. 19.

FIG. 19 is a perspective view of a sandal according to the fifteenth modification. FIG. 20 is a front view of the sandal shown in FIG. 19. With reference to FIGS. 19 and 20, the following describes a sandal 1A15 according to the fifteenth modification based on the aforementioned first embodiment. Note that the sandal 1A15 according to the fifteenth modification is manufactured by a manufacturing method pursuant to the method of manufacturing the sandal according to the aforementioned first embodiment.

As shown in FIGS. 19 and 20, the sandal 1A15 according to the fifteenth modification is basically identical in outer shape to the sandal 1A according to the aforementioned first embodiment (see FIGS. 1 to 4 and the like), but is different in configuration from the sandal 1A according to the first embodiment in that a sandal body 100A has a three-dimensional lattice structure.

More specifically, the sandal 1A15 includes the sandal body 100A including a foot bed portion 110 and a foot cover portion 120 as in the sandal 1A according to the first embodiment, and the sandal body 100A is formed of a single member. The sandal body 100A formed of a single member is composed of an additively manufactured product 2 produced by the stereolithography-type three-dimensional additive manufacturing method. The additively manufactured product 2 is configured to have a three-dimensional lattice structure by making use of the advantage of the three-dimensional additive manufacturing method that allows production of an additively manufactured product having a desired three-dimensional shape.

More specifically, the three-dimensional lattice structure can be formed, for example, of a three-dimensional mesh structure obtained by distorting the interconnected unit lattice structures so as to conform to the outer shape of the sandal body 100A. As the unit lattice structure described above, various structures are applicable, such as a rectangular parallelepiped lattice, a diamond lattice, an octahedral lattice, a double pyramid lattice, or a lattice having various supports added thereto.

The sandal body 100A having a three-dimensional lattice structure as described above allows the foot bed portion 110 to have high deformability, which makes it possible to provide a sandal excellent in shock absorbing performance, excellent in wearing comfort, and also excellent in stability during wearing. Further, the sandal body 100A having a three-dimensional lattice structure makes it possible to provide a sandal that is lighter for its size, and also provide a sandal excellent in air permeability. From the viewpoint of weight reduction and air permeability, the porosity of the foot bed portion 110 is preferably 50% or more.

Thus, the sandal 1A15 according to the present fifteenth modification in which the sandal body 100A has a three-dimensional lattice structure is particularly suitable to be utilized as a recovery shoe (a recovery sandal) used, for example, after a highly intensive physical exercise or activity (running, various types of ball games, mountain climbing, and the like), or during and before/after a long-time flight (traveling by airplane) and the like, and is also particularly effective for fatigue recovery by dispersion of foot pressure, for support of the foot arch, for support against heel collapse called pronation, and the like.

In this case, similarly to the sandal 1A according to the aforementioned first embodiment, the sandal 1A15 is provided with a ridge portion 123 as a protruding portion at a prescribed position on the outer surface 121 of the foot cover portion 120.

Thus, similarly to the sandal 1A according to the aforementioned first embodiment, the sandal 1A15 according to the present fifteenth modification not only can prevent occurrence of shape defects during the additive manufacturing of the foot cover portion 120 by the stereolithography-type three-dimensional additive manufacturing method, but also can provide a light-weight sandal excellent in wearing comfort and suitably applicable particularly for recovery purpose.

Although the present fifteenth modification illustrates the case where the sandal body 100A has a three-dimensional lattice structure, the sandal body 100A may have a three-dimensional structure different from the three-dimensional lattice structure. By way of example, the sandal body 100A may have a three-dimensional structure obtained by adding a thickness to a triply periodic minimal surface such as a Schwartz P structure or a gyroid structure as a base structure or may have a three-dimensional structure obtained by adding a thickness to a planar structure such as an octet structure or a cubic structure.

Further, the entire sandal body 100A does not have to be formed of unit structures having the same size, but may be formed of unit structures different in size from part to part. Further, the entire sandal body 100A does not have to have the same three-dimensional structure, but may be configured to have partially different three-dimensional structures, for example, in such a manner that the foot bed portion 110 and the foot cover portion 120 have different three-dimensional structures, or that different three-dimensional structures are provided forward and rearward or leftward and rightward of the foot bed portion 110.

<Sixteenth Modification>

Figure 21:
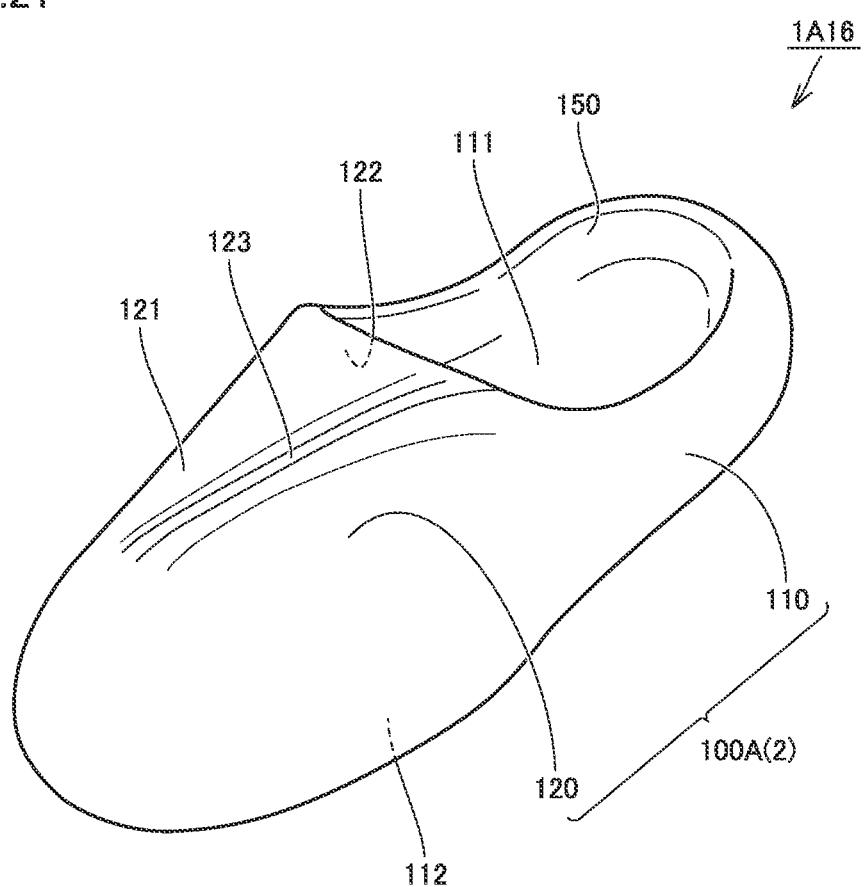
FIG. 21 is a perspective view of a sandal according to a seventeenth modification.
Figure 22:
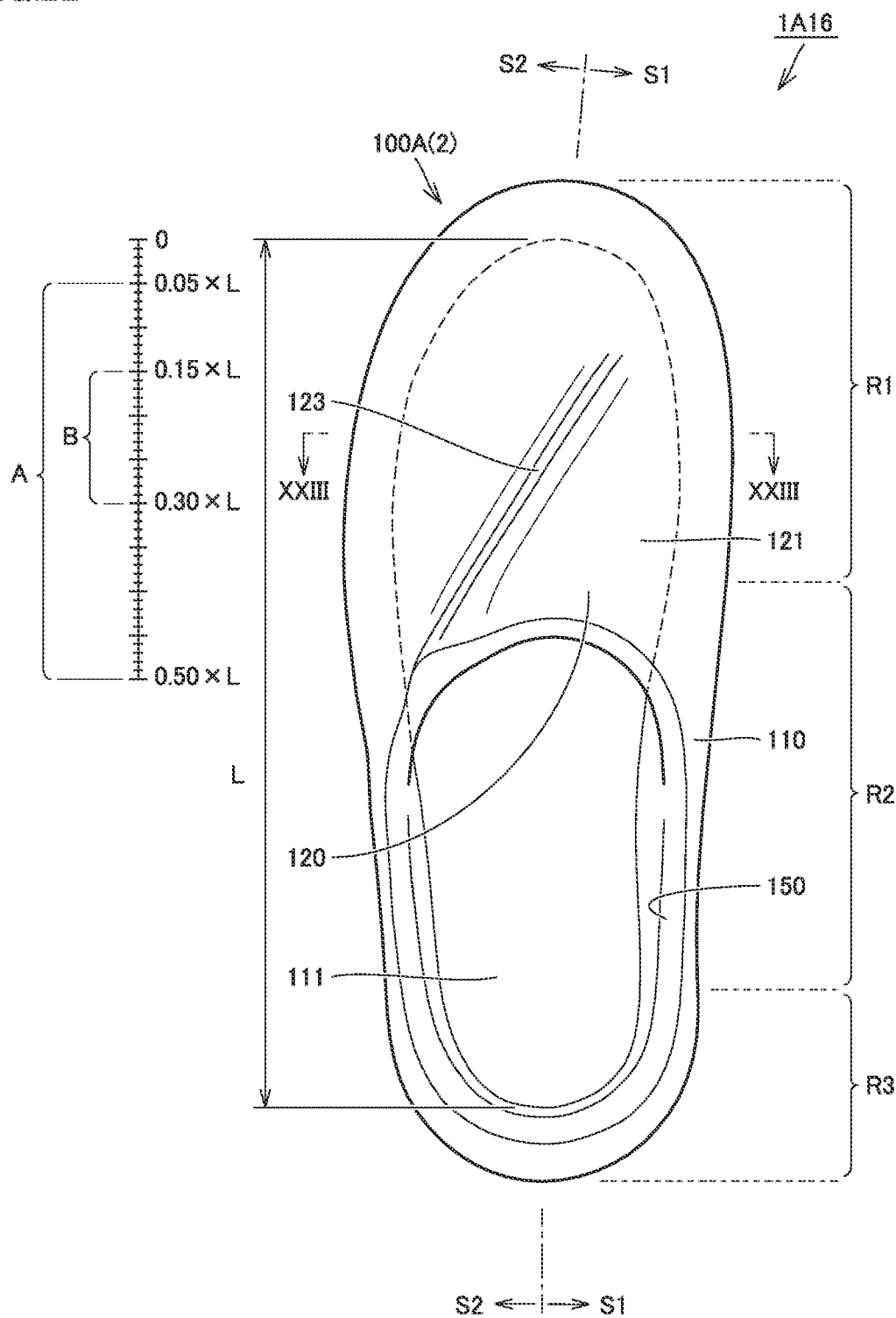
FIG. 22 is a plan view of the sandal shown in FIG. 21.
Figure 23:
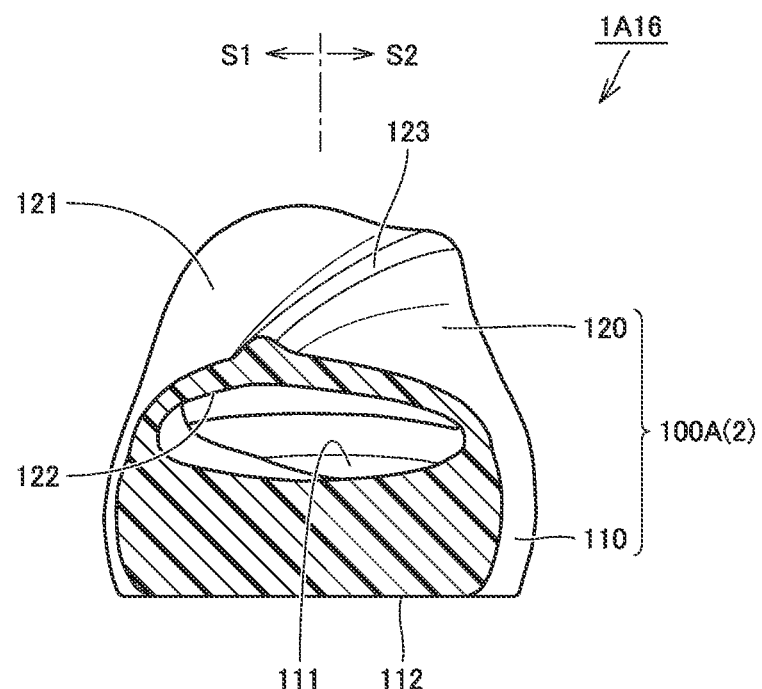
FIG. 23 is a cross-sectional view showing the sandal in FIG. 21 and taken along a line XXIII-XXIII in FIG. 22.

FIG. 21 is a perspective view of a sandal according to the sixteenth modification. FIG. 22 is a plan view of the sandal shown in FIG. 21. FIG. 23 is a cross-sectional view showing the sandal in FIG. 21 and taken along a line XXIII-XXIII in FIG. 22. With reference to FIGS. 21 to 23, the following describes a sandal 1A16 according to the sixteenth modification based on the aforementioned first embodiment. The sandal 1A16 according to the present sixteenth modification is manufactured by a manufacturing method pursuant to the method of manufacturing the sandal according to the aforementioned first embodiment.

As shown in FIGS. 21 to 23, the sandal 1A16 according to the sixteenth modification is different from the sandal 1A according to the aforementioned first embodiment (see FIGS. 1 to 4 and the like) in that the front opening 151 is not provided.

More specifically, in the sandal 1A16, the foot cover portion 120 has a semi-dome shape and has a lower end connected to the end portions of the foot bed portion 110 on the front end side, the medial foot side, and the lateral foot side.

Accordingly, in the sandal 1A16, the foot cover portion 120 is located to reach a portion closer to the front end side in the front-rear direction as compared with the sandal 1A according to the first embodiment. The foot cover portion 120 in this portion closer to the front end side serves as a part covering a flatter portion of the surface of the instep of the wearer's foot. Thus, the ridge portion 123 is provided so as to reach this part in the sandal 1A16 according to the present sixteenth modification in which the front opening 151 is not provided.

Therefore, also in the case of the sandal 1A16 according to the present sixteenth modification, the ridge portion 123 as a protruding portion is provided at a prescribed position on the outer surface 121 of the foot cover portion 120, and thus, occurrence of shape defects can be prevented during the additive manufacturing of the foot cover portion 120 by the stereolithography-type three-dimensional additive manufacturing method, similarly to the case of the sandal 1A according to the aforementioned first embodiment.

The ridge portion 123 should only be provided at least at a position in the range A or the range B (see the aforementioned first embodiment for more details) shown in the figure, but may be provided beyond the range A or B. For example, in consideration of the design characteristics, the portion on the front end side of the ridge portion 123 may be further extended toward the front side in the front-rear direction so as to reach the front end of the forefoot portion R1 (i.e., the end portion on the toe side).

Further, also in the case where the foot cover portion 120 is configured to have a semi-dome shape as in the present sixteenth modification, the protruding portion may be formed by the ridge portion 123 or the projecting portion 124 as set forth in the aforementioned first to fifteenth modifications. Also in that case, the ridge portion 123 or the projecting portion 124 should only be provided at least at a position in the range A or the range B, but may be provided beyond the range A or B, for example, so as to be located at the front end of the forefoot portion R1.

Second Embodiment

Figure 24:
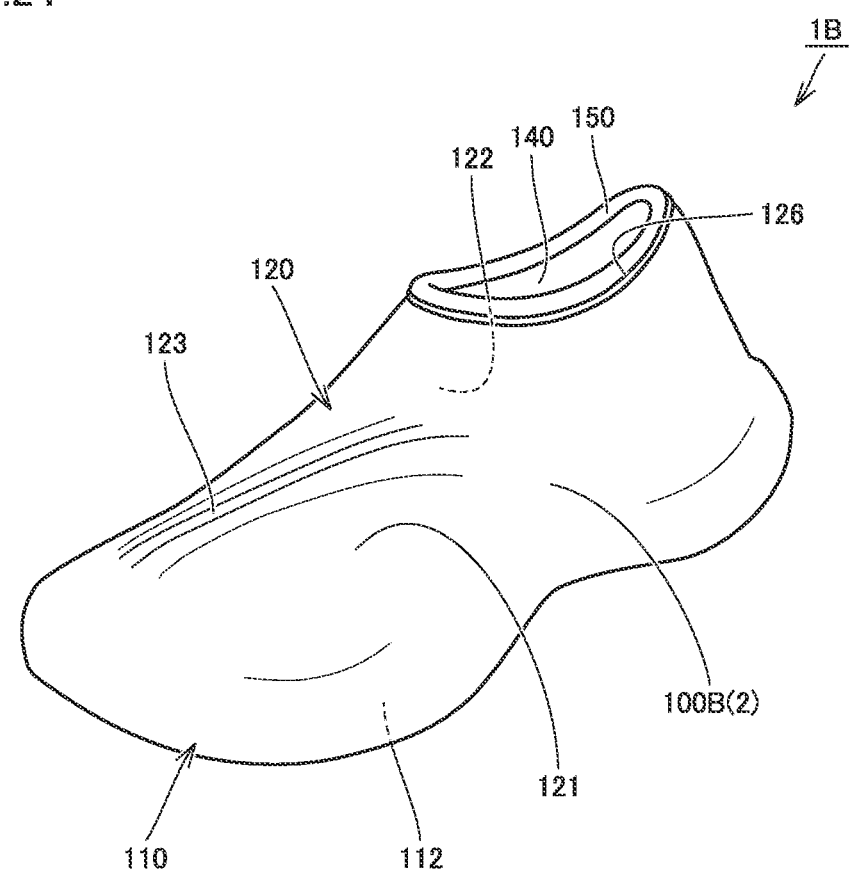
FIG. 24 is a perspective view of a shoe according to a second embodiment.
Figure 25:
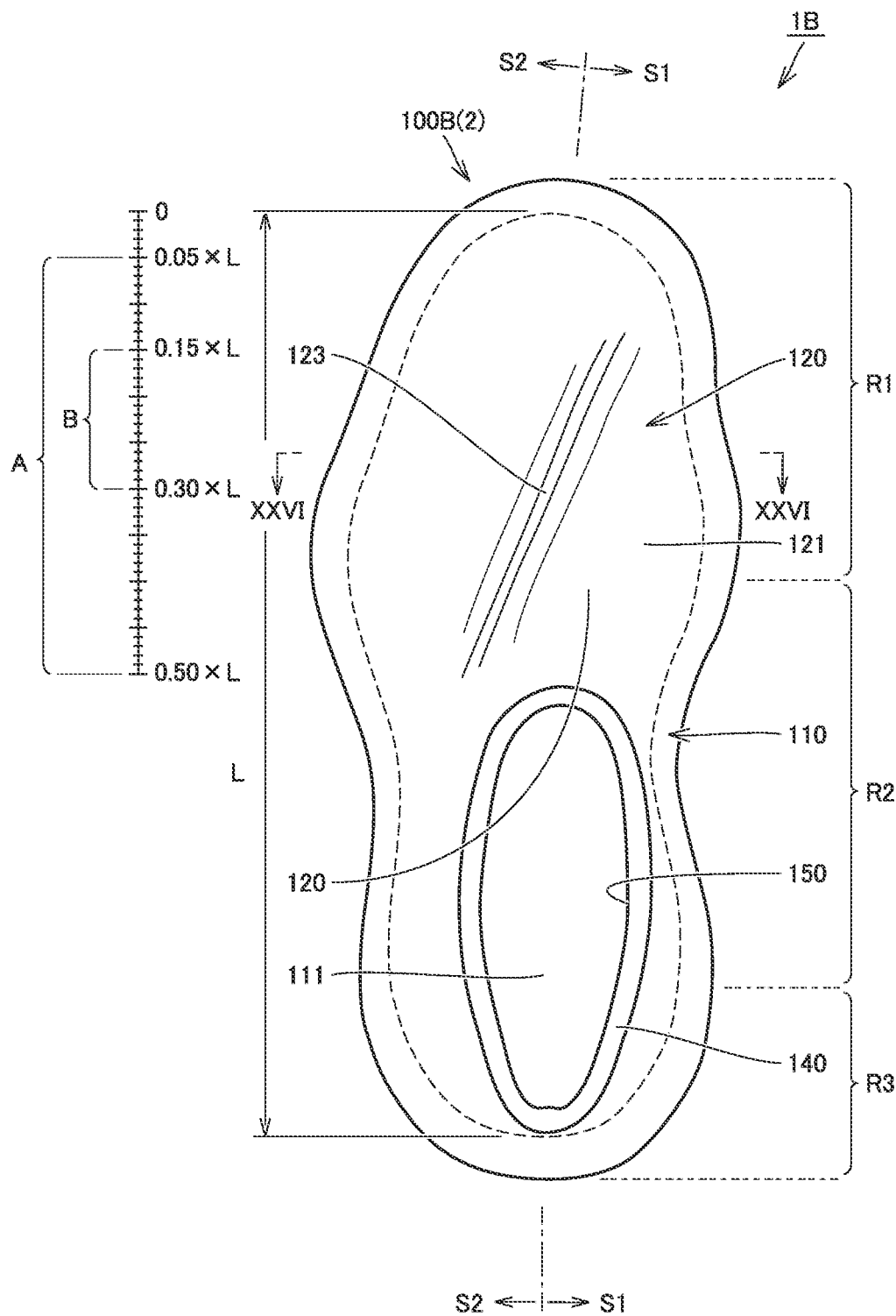
FIG. 25 is a plan view of the shoe shown in FIG. 24.
Figure 26:
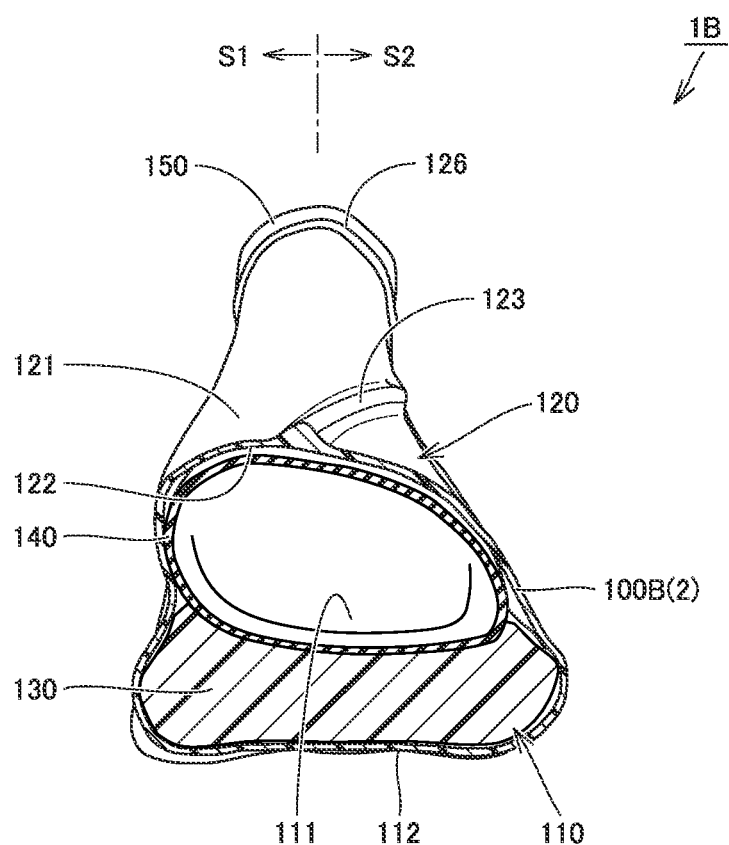
FIG. 26 is a cross-sectional view showing the shoe in FIG. 24 and taken along a line XXVI-XXVI in FIG. 25.
Figure 27:
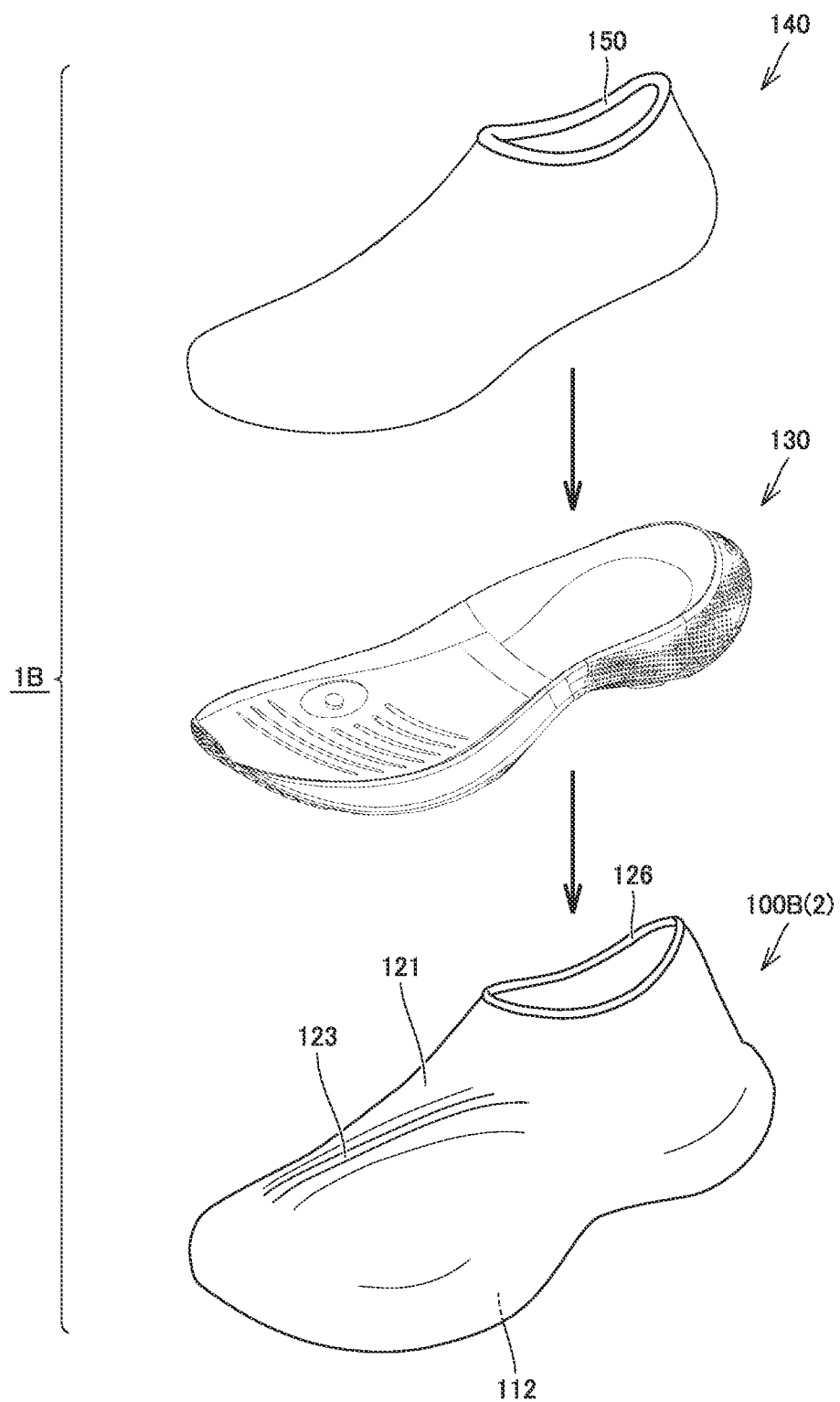
FIG. 27 is an exploded view of the shoe shown in FIG. 24.

FIG. 24 is a perspective view of a shoe according to the second embodiment. FIG. 25 is a plan view of the shoe shown in FIG. 24. FIG. 26 is a cross-sectional view showing the shoe in FIG. 24 and taken along a line XXVI-XXVI in FIG. 25. FIG. 27 is an exploded view of the shoe shown in FIG. 24. With reference to FIGS. 24 to 27, the following describes a shoe 1B according to the present embodiment.

As shown in FIGS. 24 to 27, the shoe 1B has a sock shape that covers substantially the entire foot of the wearer (i.e., a portion extending from an ankle to a distal end) and includes a shell 100B, a sole body 130, and an upper body 140. Along an upper portion of the shoe 1B, a topline 150 is provided through which a foot is inserted. Inside the shoe 1B, a space is provided in which a wearer's foot is inserted when the wearer wears the shoe 1B. Thereby, the wearer's foot is inserted into the inside space through the topline 150, so that the wearer can wear the shoe 1B.

In the shoe 1B, the sole body 130 is accommodated in the shell 100B, and the upper body 140 is accommodated in the shell 100B to be located on the sole body 130. Thereby, the sole body 130 is sandwiched between the shell 100B and the upper body 140.

Thus, in the shoe 1B, the foot bed portion 110 that serves to support the sole of the wearer's foot is formed of a bottom portion of the shell 100B, the sole body 130, and a bottom portion of the upper body 140. Also, the foot cover portion 120 that serves to cover the instep of the wearer's foot is formed of: a semi-dome-shaped portion provided to stand upright from the end portions on the front end side, the medial foot side, and the lateral foot side in the bottom portion of the shell 100B; and a semi-dome-shaped portion provided to stand upright from the end portions on the front end side, the medial foot side, and the lateral foot side in the bottom portion of the upper body 140.

The shell 100B is formed of a single member having a bag shape. The shell 100B includes a bottom portion constituting the aforementioned foot bed portion 110 and a shoe upper portion connected to the entire circumference of the circumferential edge of the bottom portion. A part of this shoe upper portion forms the above-mentioned semi-dome-shaped portion of the shell 100B that forms the foot cover portion 120. Further, the shell 100B covers a bottom surface and a circumferential surface of the sole body 130 and a surface of the upper body 140, and has an upper end provided with an opening 126. The shell 100B includes a bottom portion having a lower surface provided with a ground contact surface 112.

The shell 100B is formed of an additively manufactured product 2 produced by the stereolithography-type three-dimensional additively manufacturing method. In this case, the shell 100B is produced through manufacturing steps pursuant to the steps of manufacturing the sandal body 100A in the method of manufacturing the sandal according to the aforementioned first embodiment.

In other words, the shell 100B is produced with the above-mentioned three-dimensional additive manufacturing apparatus 1000 (see FIGS. 5 to 7 and the like) by the stereolithography-type three-dimensional additive manufacturing method in the following manner Specifically, the bottom portion that is to form a part of the foot bed portion 110 is sequentially additively manufactured starting from the ground contact surface 112 side in the direction orthogonal to the ground contact surface 112, and subsequently, the above-described shoe upper portion that is to form a part of the foot cover portion 120 is sequentially additively manufactured, to thereby produce the shell 100B.

The material of the shell 100B is not particularly limited, but may be the same as the material of the sandal body 100A described in the aforementioned first embodiment.

The sole body 130 is formed of an elastically-deformable flat member. The sole body 130 is disposed in the space provided inside the shell 100B to be located in a lower space close to the ground contact surface 112.

The sole body 130 may basically be made of any material as long as it is elastically deformable but is preferably formed of a member having suitable strength while maintaining excellent cushioning. From this viewpoint, the sole body 130 is made, for example, using a resin-made foam material containing: a resin material as a main component; and a foaming agent and a cross-linking agent as sub-components. Alternatively, the sole body 130 may be made using a rubber-made foam material containing: a rubber material as a main component; and a plasticizer, a foaming agent, a reinforcing agent, and a cross-linking agent as sub-components.

The upper body 140 constitutes a portion of the shoe 1B that comes into contact with the wearer's foot, and is formed of a flexibly deformable member having a bag shape. The upper body 140 is disposed in the space provided inside the shell 100B to be located in an upper space close to the opening 126.

The upper surface of the bottom portion of the upper body 140 defines a foot bed region 111 that is capable of supporting the sole of the wearer's foot. Further, an upper end of the upper body 140 is located so as to protrude outward from the opening 126, and a portion of the upper body 140 that protrudes from the opening 126 forms the above-mentioned topline 150.

The upper body 140 may basically be formed of any material as long as it is flexibly deformable, but is preferably made using woven fabric, knitted fabric, nonwoven fabric, synthetic leather, resin, or the like. In particular, as described later, by using woven fabric, knitted fabric, nonwoven fabric, or the like made of synthetic fibers having heat deformability (for example, heat shrinkability), the upper body 140 can be formed to be more excellently fitted to the wearer's foot. Examples of synthetic fibers having heat shrinkability include those containing polyester, polyurethane, or the like as a main component.

In other words, in the case where the upper body 140 is formed of woven fabric, knitted fabric, nonwoven fabric, or the like made of synthetic fibers having heat shrinkability, the upper body 140 is formed in a bag shape in advance, into which a last (described later) is inserted and then subjected to a heat treatment. Due to heating, the upper body 140 is thermally shrunk, so that the upper body 140 is changed in shape and comes into close contact with the forming surface of the last, and then, this changed shape is maintained.

Accordingly, a last conforming to the shape of the wearer's foot is prepared and used to form the aforementioned upper body 140, and thereby, the upper body 140 fitted to the wearer's foot can be produced. Further, when the abovementioned heat treatment is performed together with the last in the state in which the upper body 140 is assembled in the shell 100B, the upper body 140 is fitted also to the shell 100B, which allows a further improved fit to the wearer's foot.

As shown in FIGS. 24 to 26, in the shoe 1B, a ridge portion 123 as a protruding portion is provided at a prescribed position in the foot cover portion 120. More specifically, the ridge portion 123 is provided on the outer surface 121 of the foot cover portion 120 as in the case of the sandal 1A according to the aforementioned first embodiment, and further more specifically, provided on the exposed surface of the shell 100B that defines the outer surface 121 of the foot cover portion 120.

The ridge portion 123 extends linearly so as to intersect the left-right direction corresponding to the foot width direction of the wearer's foot, the front end of the ridge portion 123 is located on the medial foot side (i.e., the S1 side) with respect to the central portion in the left-right direction, and the rear end of the ridge portion 123 is located on the lateral foot side (i.e., the S2 side) with respect to the central portion in the left-right direction. Further, the ridge portion 123 extends linearly in the oblique direction so as to be gradually away from the end portion on the medial foot side of the foot cover portion 120 from the front end toward the rear end of the ridge portion 123.

Also in the shoe 1B according to the present embodiment, similarly to the sandal 1A according to the aforementioned first embodiment, the shell 100B is sequentially additively manufactured by the stereolithography-type three-dimensional additive manufacturing method starting from the ground contact surface 112 side. Thus, the foot cover portion 120 as a portion to be additively manufactured is located in the direction in which the shell 100B is additively manufactured, when viewed from the hollow portion that is a relatively large space provided between the foot bed portion 110 and the foot cover portion 120.

Accordingly, when no measures are taken, shape defects may occur in the outer surface 121 of the foot cover portion 120 (i.e., the exposed surface of the shell 100B). In the shoe 1B according to the present embodiment, however, the ridge portion 123 as a protruding portion is provided on the outer surface 121 of the foot cover portion 120, similarly to the sandal 1A according to the aforementioned first embodiment. Thus, the outer surface 121 of this portion is not flat but curved or bent, so that hanging down of the liquid resin 200 or the like can be suppressed in advance. This prevents occurrence of shape defects, which makes it possible to prevent impairment of the external appearance and deterioration in wearing comfort.

Unlike the sandal 1A according to the aforementioned first embodiment, in the shoe 1B according to the present embodiment, the portion closer to the front end of the sandal 1B is not provided with the front opening 151 (see FIG. 1 and the like) through which the toes of the wearer's foot are exposed. Accordingly, in the shoe 1B, the foot cover portion 120 is to be located to reach a portion closer to the front end side in the front-rear direction as compared with the sandal 1A. The foot cover portion 120 in this portion closer to the front end side serves as a part covering a flatter portion of the surface of the instep of the wearer's foot. Thus, the ridge portion 123 is provided so as to reach this part in the shoe 1B according to the present embodiment in which the front opening 151 is not provided.

As described above, also in the case of the shoe 1B according to the present embodiment, similarly to the case of the sandal 1A according to the aforementioned first embodiment, occurrence of shape defects can be prevented during the additive manufacturing of the foot cover portion 120 by the stereolithography-type three-dimensional additive manufacturing method.

The ridge portion 123 should only be provided at least at a position in the range A or the range B (see the aforementioned first embodiment for more details) shown in the figure, but may be provided beyond the range A or B. For example, in consideration of the design characteristics, the portion on the front end side of the ridge portion 123 may be further extended toward the front side in the front-rear direction so as to reach the front end of the forefoot portion R1 (i.e., the end portion on the toe side).

SUMMARY OF THE DISCLOSURE IN EMBODIMENTS

The following summarizes the characteristic points disclosed in the embodiments and the modifications thereof as described above.

[Supplementary Note 1]

A footwear includes: a foot bed portion that supports a sole of a foot of a wearer and has a ground contact surface; and a foot cover portion that covers an instep of the foot of the wearer. At least a part of the foot bed portion and at least a part of the foot cover portion are formed of a single additively manufactured product produced by a stereolithography-type three-dimensional additive manufacturing method, and a protruding portion is provided on an outer surface defined by the additively manufactured product of the foot cover portion.

[Supplementary Note 2]

In the footwear according to Supplementary Note 1, the foot bed portion has an upper surface including a foot bed region capable of supporting the sole of the foot of the wearer. Assuming that a distance from a front end position to a rear end position in the foot bed region in a front-rear direction corresponding to a foot length direction of the foot of the wearer is defined as L, and that a range of the footwear is specified by dividing the footwear along an imaginary plane orthogonal to the front-rear direction, the protruding portion is provided at a position in a range between an imaginary plane set at a position distanced by 0.05×L in the front-rear direction from the front end position and an imaginary plane set at a position distanced by 0.50×L in the front-rear direction from the front end position.

[Supplementary Note 3]

In the footwear according to Supplementary Note 2, the protruding portion is provided at a position in a range between an imaginary plane set at a position distanced by 0.15×L in the front-rear direction from the front end position and an imaginary plane set at a position distanced by 0.30×L in the front-rear direction from the front end position.

[Supplementary Note 4]

In the footwear according to any one of Supplementary Notes 1 to 3, a protruding height of the protruding portion is 3.0 mm or more and 10.0 mm or less.
[Supplementary Note 5]
In the footwear according to any one of Supplementary Notes 1 to 4, the protruding portion is formed of a ridge portion that linearly extends.
[Supplementary Note 6]
In the footwear according to Supplementary Note 5, the ridge portion extends so as to intersect a left-right direction corresponding to a foot width direction of the foot of the wearer.
[Supplementary Note 7]
In the footwear according to Supplementary Note 6, a groove portion extending in an extending direction of the ridge portion is provided on an inner surface of the foot cover portion in a portion where the ridge portion is formed.
[Supplementary Note 8]
In the footwear according to Supplementary Note 6 or 7, a front end of the ridge portion is located on a medial foot side with respect to a central portion in the left-right direction.
[Supplementary Note 9]
In the footwear according to Supplementary Note 8, the ridge portion extends so as to be gradually away from an end portion on the medial foot side of the foot cover portion from the front end toward a rear end of the ridge portion.
[Supplementary Note 10]
In the footwear according to Supplementary Note 8 or 9, a rear end of the ridge portion is located on a lateral foot side with respect to the central portion in the left-right direction.
[Supplementary Note 11]
In the footwear according to any one of Supplementary Notes 1 to 10, the additively manufactured product has a three-dimensional lattice structure.
[Supplementary Note 12]
In the footwear according to any one of Supplementary Notes 1 to 11, the footwear is a sandal, and a portion forming the foot cover portion in the additively manufactured product has a strap shape connected to an end portion on a medial foot side of the foot bed portion and an end portion on a lateral foot side of the foot bed portion in the additively manufactured product.
[Supplementary Note 13]
In the footwear according to any one of Supplementary Notes 1 to 11, the footwear is a shoe, and a portion forming the foot cover portion in the additively manufactured product is formed of a part of a shoe upper portion connected to an entire circumference of a circumferential edge of the foot bed portion in the additively manufactured product, the circumferential edge being viewed in a direction orthogonal to the ground contact surface.
[Supplementary Note 14]
In a method of manufacturing a footwear including: a foot bed portion that supports a sole of a foot of a wearer and has a ground contact surface; and a foot cover portion that covers an instep of the foot of the wearer, the method includes: producing the foot bed portion; and producing the foot cover portion. The producing the foot bed portion and the producing the foot cover portion include: by a stereolithography-type three-dimensional additive manufacturing method, sequentially additively manufacturing at least a part of the foot bed portion starting from a side of the ground contact surface in a direction orthogonal to the ground contact surface, and subsequently, sequentially additively manufacturing at least a part of the foot cover portion to additively manufacture a single additively manufactured product. In the producing the foot cover portion, a protruding portion is provided on an outer surface that is to be defined by the additively manufactured product of the foot cover portion.

Other Embodiments

The above embodiments and modifications thereof have been described with reference to the case where the protruding portion provided on the outer surface of the foot cover portion is formed of a linearly extending ridge portion or a projecting portion having a spot-like shape, but the shape of the protruding portion is not limited thereto and may be variously modified. Further, the number, layout and the like of the protruding portion(s) can be variously changed as required.

Further, the above embodiments and modifications thereof have been described with reference to the case where the foot cover portion that serves to cover the instep of the wearer's foot is configured to have a single strap shape or a semi-dome shape, but the foot cover portion may be configured to have a plurality of strap shapes arranged in the front-rear direction, or may be configured to be formed of a semi-dome-shaped portion disposed at the front end and a single or a plurality of strap-shaped portion(s) disposed behind thereof. In this case, a protruding portion does not necessarily have to be provided in each of the divided foot cover portions, but should only be provided at an appropriate position in at least one of the divided foot cover portions.

Further, the above embodiments and modifications thereof have been described with reference to only the sandal according to the fifteenth modification as a footwear in which an additively manufactured product constituting a part of the foot bed portion and a part of the foot cover portion has a three-dimensional lattice structure. However, also in the sandal or the shoe according to each of other modifications and embodiments, an additively manufactured product included therein can be configured to have a three-dimensional lattice structure.

Further, the above embodiments and modifications thereof have been described with reference to the case where the present invention is applied to a sandal and a shoe, but may also be naturally applicable to other types of footwear. Further, even when the present invention is applied to a shoe, the present invention is not only applicable to a shoe including an upper body having heat shrinkability as described above, but also applicable to shoes having various configurations.

Further, the characteristic configurations disclosed in the aforementioned embodiments and modifications thereof can be combined with each other without departing from the gist of the present invention.

Although the embodiments of the present invention have been described, it should be understood that the embodiments disclosed herein are illustrative and not restrictive in all respects. The scope of the present invention is defined by the terms of the claims and is intended to include any modifications within the meaning and scope equivalent to the terms of the claims.

What is claimed is:
1. A footwear comprising:
a foot bed portion including a ground contact surface and a foot bed region configured to support a sole of a foot of a wearer, wherein in a plan view, the foot bed portion comprises a forefoot portion, a midfoot portion, and a rear foot portion along a front-rear direction corresponding to a foot length of the foot of the wearer; and a foot cover portion configured to cover an instep of the foot of the wearer, wherein in the plan view, the foot cover portion includes a rear end over the midfoot portion of the foot bed portion, wherein at least a part of the foot bed portion and at least a part of the foot cover portion are configured of a single additively manufactured product having been produced by a stereolithography-type three-dimensional additive manufacturing method, a protruding portion is on an outer surface defined by the additively manufactured product of the foot cover portion, the protruding portion includes a first end and a second end, the first end resides over the forefoot portion, the second end resides at a position corresponding to a top of the instep of the foot of the wearer adjacent to the rear end of the foot cover portion, and a thickness of the protruding portion is greater than surrounding portions of the foot cover portion over the foot bed region.

2. The footwear according to claim 1, wherein the foot bed portion has an upper surface including the foot bed region configured to support the sole of the foot of the wearer, and assuming that a distance from a front end position to a rear end position in the foot bed region in the front-rear direction corresponding to a foot length direction of the foot of the wearer is defined as L, and that a range of the footwear is specified by dividing the footwear along an imaginary plane orthogonal to the front-rear direction, the protruding portion is at a position in a range between an imaginary plane set at a position distanced by 0.05×L in the front-rear direction from the front end position and an imaginary plane set at a position distanced by 0.50×L in the front-rear direction from the front end position.

3. The footwear according to claim 2, wherein the protruding portion is at a position in a range between an imaginary plane set at a position distanced by 0.15×L in the front-rear direction from the front end position and an imaginary plane set at a position distanced by 0.30×L in the front-rear direction from the front end position.

4. The footwear according to claim 1, wherein a protruding height of the protruding portion is from 3.0 mm to 10.0 mm.

5. The footwear according to claim 1, wherein the protruding portion includes a ridge portion that linearly extends.

6. The footwear according to claim 5, wherein the ridge portion extends to intersect a left-right direction corresponding to a foot width direction of the foot of the wearer.

7. The footwear according to claim 6, wherein a groove portion extending in an extending direction of the ridge portion is on an inner surface of the foot cover portion in a portion where the ridge portion is formed.

8. The footwear according to claim 6, wherein a front end of the ridge portion is located on a medial foot side with respect to a central portion in the left-right direction.

9. The footwear according to claim 8, wherein the ridge portion extends so as to be gradually away from an end portion on the medial foot side of the foot cover portion from the front end toward a rear end of the ridge portion.

10. The footwear according to claim 8, wherein a rear end of the ridge portion is located on a lateral foot side with respect to the central portion in the left-right direction.

11. The footwear according to claim 1, wherein the additively manufactured product has a three-dimensional lattice structure.

12. The footwear according to claim 1, wherein the footwear is a sandal, and a portion configuring the foot cover portion in the additively manufactured product has a strap connected to an end portion on a medial foot side of the foot bed portion and an end portion on a lateral foot side of the foot bed portion in the additively manufactured product.

13. The footwear according to claim 1, wherein the footwear is a shoe, and a portion forming the foot cover portion in the additively manufactured product is configured of a part of a shoe upper portion connected to an entire circumference of a circumferential edge of the foot bed portion in the additively manufactured product, the circumferential edge being viewed in a direction orthogonal to the ground contact surface.

* * * * *